United States Patent
Wang et al.

(10) Patent No.: US 12,344,168 B1
(45) Date of Patent: Jul. 1, 2025

(54) SYSTEMS AND METHODS FOR DASHCAM INSTALLATION

(71) Applicant: Samsara Inc., San Francisco, CA (US)

(72) Inventors: Jing Wang, Toronto (CA); William Evan Welbourne, Seattle, WA (US); Sharan Srinivasan, Sunnyvale, CA (US); Shirish Raghav Nair, Shoreline, WA (US); Faraz Abbasi, San Francisco, CA (US); Margaret Finch, Austin, TX (US); Ingo Wiegand, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 251 days.

(21) Appl. No.: 17/935,899

(22) Filed: Sep. 27, 2022

(51) Int. Cl.
| | |
|---|---|
| *H04N 23/611* | (2023.01) |
| *B60R 11/02* | (2006.01) |
| *G06V 10/25* | (2022.01) |
| *H04N 23/60* | (2023.01) |
| *H04N 23/617* | (2023.01) |
| *B60R 11/00* | (2006.01) |

(52) U.S. Cl.
CPC .......... *B60R 11/0211* (2013.01); *G06V 10/25* (2022.01); *H04N 23/611* (2023.01); *H04N 23/617* (2023.01); *H04N 23/64* (2023.01); *B60R 2011/0005* (2013.01)

(58) Field of Classification Search
CPC ........ B60R 11/0211; B60R 2011/0005; G06V 10/25; H04N 23/611; H04N 23/617; H04N 23/64
See application file for complete search history.

(56) References Cited

U.S. PATENT DOCUMENTS

| | | |
|---|---|---|
| 4,671,111 A | 6/1987 | Lemelson |
| 5,825,283 A | 10/1998 | Camhi |
| 5,917,433 A | 6/1999 | Keillor et al. |

(Continued)

FOREIGN PATENT DOCUMENTS

| | | |
|---|---|---|
| CN | 111047179 A | 4/2020 |
| DE | 10 2004 015 221 A1 | 10/2005 |

(Continued)

OTHER PUBLICATIONS

US 11,450,210 B2, 09/2022, Tsai et al. (withdrawn)
(Continued)

*Primary Examiner* — Mekonnen D Dagnew
(74) *Attorney, Agent, or Firm* — Knobbe, Martens, Olson & Bear, LLP

(57) ABSTRACT

The present disclosure is related to systems and methods of dashcam installation for providing instructions on placing a dashcam for a person or dashcam installer. Aspects of the present disclosure are related to providing a digital assistant for installing the dashcam in an acceptable position, where the dashcam can capture images of objects with acceptable quality (e.g., as determined by a machine learning model). In some embodiments, the dashcam detects a driver and provides inferences related to the current dashcam position. The inferences can be based on analyzing images captured by the dashcam in the current position, where the analysis can utilize a machine learning model. The inferences can also provide one or more instructions to move and/or tilt the dashcam to the acceptable installation position.

21 Claims, 7 Drawing Sheets

(56) References Cited

U.S. PATENT DOCUMENTS

| | | | |
|---|---|---|---|
| 6,064,299 A | 5/2000 | Lesesky et al. |
| 6,098,048 A | 8/2000 | Dashefsky et al. |
| 6,157,864 A | 12/2000 | Schwenke et al. |
| 6,253,129 B1 | 6/2001 | Jenkins et al. |
| 6,317,668 B1 | 11/2001 | Thibault et al. |
| 6,411,203 B1 | 6/2002 | Lesesky et al. |
| 6,421,590 B2 | 7/2002 | Thibault |
| 6,452,487 B1 | 9/2002 | Krupinski |
| 6,505,106 B1 | 1/2003 | Lawrence et al. |
| 6,651,063 B1 | 11/2003 | Vorobiev |
| 6,714,894 B1 | 3/2004 | Tobey et al. |
| 6,718,239 B2 | 4/2004 | Rayner |
| 6,741,165 B1 | 5/2004 | Langfahl et al. |
| 6,801,920 B1 | 10/2004 | Wischinski |
| 7,117,075 B1 | 10/2006 | Larschan et al. |
| 7,139,780 B2 | 11/2006 | Lee et al. |
| 7,209,959 B1 | 4/2007 | Campbell et al. |
| 7,233,684 B2 | 6/2007 | Fedorovskaya et al. |
| 7,386,376 B2 | 6/2008 | Basir et al. |
| 7,389,178 B2 | 6/2008 | Raz et al. |
| 7,398,298 B2 | 7/2008 | Koch |
| 7,492,938 B2 | 2/2009 | Brinson, Jr. et al. |
| 7,526,103 B2 | 4/2009 | Schofield et al. |
| 7,555,378 B2 | 6/2009 | Larschan et al. |
| 7,596,417 B2 | 9/2009 | Fister et al. |
| 7,606,779 B2 | 10/2009 | Brinson, Jr. et al. |
| 7,715,961 B1 | 5/2010 | Kargupta |
| 7,769,499 B2 | 8/2010 | McQuade et al. |
| 7,844,088 B2 | 11/2010 | Brinson, Jr. et al. |
| 7,859,392 B2 | 12/2010 | McClellan et al. |
| 7,877,198 B2 | 1/2011 | Tenzer et al. |
| 7,881,838 B2 | 2/2011 | Larschan et al. |
| 7,957,936 B2 | 6/2011 | Eryurek et al. |
| 8,019,581 B2 | 9/2011 | Sheha et al. |
| 8,024,311 B2 | 9/2011 | Wood et al. |
| 8,032,277 B2 | 10/2011 | Larschan et al. |
| 8,140,358 B1 | 3/2012 | Ling et al. |
| 8,156,108 B2 | 4/2012 | Middleton et al. |
| 8,156,499 B2 | 4/2012 | Foulger et al. |
| 8,169,343 B2 | 5/2012 | Sheha et al. |
| 8,175,992 B2 | 5/2012 | Bass, II et al. |
| 8,230,272 B2 | 7/2012 | Middleton et al. |
| 8,260,489 B2 | 9/2012 | Nielsen et al. |
| 8,417,402 B2 | 4/2013 | Basir |
| 8,442,508 B2 | 5/2013 | Harter et al. |
| 8,457,395 B2 | 6/2013 | Boncyk et al. |
| 8,509,412 B2 | 8/2013 | Sheha et al. |
| 8,543,625 B2 | 9/2013 | Middleton et al. |
| 8,560,164 B2 | 10/2013 | Nielsen et al. |
| 8,615,555 B2 | 12/2013 | Koch |
| 8,625,885 B2 | 1/2014 | Brinson, Jr. et al. |
| 8,626,568 B2 | 1/2014 | Warkentin et al. |
| 8,633,672 B2 | 1/2014 | Jung et al. |
| 8,669,857 B2 | 3/2014 | Sun et al. |
| 8,682,572 B2 | 3/2014 | Raz et al. |
| 8,706,409 B2 | 4/2014 | Mason et al. |
| 8,831,825 B2 | 9/2014 | Shah et al. |
| 8,836,784 B2 | 9/2014 | Erhardt et al. |
| 8,918,229 B2 | 12/2014 | Hunt et al. |
| 8,953,228 B1 | 2/2015 | Mehers |
| 8,989,914 B1 | 3/2015 | Nemat-Nasser et al. |
| 8,989,959 B2 | 3/2015 | Plante et al. |
| 8,996,240 B2 | 3/2015 | Plante |
| 9,024,744 B2 | 5/2015 | Klose et al. |
| 9,053,590 B1 | 6/2015 | Kator et al. |
| 9,137,498 B1 | 9/2015 | L'Heureux et al. |
| 9,147,335 B2 | 9/2015 | Raghunathan et al. |
| 9,152,609 B2 | 10/2015 | Schwartz et al. |
| 9,165,196 B2 | 10/2015 | Kesavan et al. |
| 9,170,913 B2 | 10/2015 | Hunt et al. |
| 9,189,895 B2 | 11/2015 | Phelan et al. |
| 9,230,250 B1 | 1/2016 | Parker et al. |
| 9,230,437 B2 | 1/2016 | Brinton et al. |
| 9,280,435 B2 | 3/2016 | Hunt et al. |
| 9,311,271 B2 | 4/2016 | Wright |
| 9,344,683 B1 | 5/2016 | Nemat-Nasser et al. |
| 9,349,228 B2 | 5/2016 | Ochsendorf et al. |
| 9,384,111 B2 | 7/2016 | Hunt et al. |
| 9,389,147 B1 | 7/2016 | Lambert et al. |
| 9,402,060 B2 | 7/2016 | Plante |
| 9,412,282 B2 | 8/2016 | Hunt et al. |
| 9,439,280 B2 | 9/2016 | Chang et al. |
| 9,445,270 B1 | 9/2016 | Bicket et al. |
| 9,477,639 B2 | 10/2016 | Fischer et al. |
| 9,477,989 B2 | 10/2016 | Grimm et al. |
| 9,527,515 B2 | 12/2016 | Hunt et al. |
| 9,594,725 B1 | 3/2017 | Cook et al. |
| 9,672,667 B2 | 6/2017 | Mason et al. |
| 9,688,282 B2 | 6/2017 | Cook et al. |
| 9,728,015 B2 | 8/2017 | Kwak |
| 9,761,063 B2 | 9/2017 | Lambert et al. |
| 9,761,067 B2 | 9/2017 | Plante et al. |
| 9,811,536 B2 | 11/2017 | Morris et al. |
| 9,818,088 B2 | 11/2017 | Penilla et al. |
| 9,846,979 B1 | 12/2017 | Sainaney et al. |
| 9,849,834 B2 | 12/2017 | Reed et al. |
| 9,852,625 B2 | 12/2017 | Victor et al. |
| 9,892,376 B2 | 2/2018 | Pfeiffer et al. |
| 9,922,567 B2 | 3/2018 | Molin et al. |
| 9,934,628 B2 | 4/2018 | Kreiner et al. |
| 9,996,980 B1 | 6/2018 | Gonzalez et al. |
| 10,015,452 B1 | 7/2018 | Schofield et al. |
| 10,033,706 B2 | 7/2018 | Bicket et al. |
| 10,040,459 B1 | 8/2018 | Kukreja |
| 10,065,652 B2 | 9/2018 | Shenoy et al. |
| 10,068,392 B2 | 9/2018 | Cook et al. |
| 10,075,669 B2 | 9/2018 | Vanman et al. |
| 10,083,547 B1 | 9/2018 | Tomatsu |
| 10,085,149 B2 | 9/2018 | Bicket et al. |
| 10,094,308 B2 | 10/2018 | Kolhouse et al. |
| 10,102,495 B1 | 10/2018 | Zhang et al. |
| 10,127,810 B2 | 11/2018 | Durie, Jr. et al. |
| 10,157,321 B2 | 12/2018 | Becker et al. |
| 10,173,486 B1 | 1/2019 | Lee et al. |
| 10,173,544 B2 | 1/2019 | Hendrix et al. |
| 10,196,071 B1 | 2/2019 | Rowson et al. |
| 10,206,107 B2 | 2/2019 | Bicket et al. |
| 10,223,935 B2 | 3/2019 | Sweany et al. |
| 10,275,959 B2 | 4/2019 | Ricci |
| 10,286,875 B2 | 5/2019 | Penilla et al. |
| 10,290,036 B1 | 5/2019 | Gella et al. |
| 10,311,749 B1 | 6/2019 | Kypri et al. |
| 10,336,190 B2 | 7/2019 | Yokochi et al. |
| 10,388,075 B2 | 8/2019 | Schmirler et al. |
| 10,389,739 B2 | 8/2019 | Solotorevsky |
| 10,390,227 B2 | 8/2019 | Bicket et al. |
| 10,444,949 B2 | 10/2019 | Scott et al. |
| 10,445,559 B2 | 10/2019 | Joseph et al. |
| 10,459,444 B1 | 10/2019 | Kentley-Klay |
| 10,460,183 B2 | 10/2019 | Welland et al. |
| 10,460,600 B2 | 10/2019 | Julian et al. |
| 10,471,955 B2 | 11/2019 | Kouri et al. |
| 10,486,709 B1 | 11/2019 | Mezaael |
| 10,489,222 B2 | 11/2019 | Sathyanarayana et al. |
| 10,523,904 B2 | 12/2019 | Mahmoud et al. |
| 10,573,183 B1 | 2/2020 | Li et al. |
| 10,579,123 B2 | 3/2020 | Tuan et al. |
| 10,609,114 B1 | 3/2020 | Bicket et al. |
| 10,621,873 B1 | 4/2020 | Spiel et al. |
| 10,623,899 B2 | 4/2020 | Watkins et al. |
| 10,632,941 B2 | 4/2020 | Chauncey et al. |
| 10,652,335 B2 | 5/2020 | Botticelli |
| 10,715,976 B2 | 7/2020 | Hoffner et al. |
| 10,762,363 B2 | 9/2020 | Watanabe |
| 10,782,691 B2 | 9/2020 | Suresh et al. |
| 10,788,990 B2 | 9/2020 | Kim et al. |
| 10,789,840 B2 | 9/2020 | Boykin et al. |
| 10,803,496 B1 | 10/2020 | Hopkins |
| 10,818,109 B2 | 10/2020 | Palmer et al. |
| 10,827,324 B1 | 11/2020 | Hajimiri et al. |
| 10,843,659 B1 | 11/2020 | Innocenzi et al. |
| 10,848,670 B2 | 11/2020 | Gatti et al. |
| 10,878,030 B1 | 12/2020 | Lambert et al. |
| 10,969,852 B2 | 4/2021 | Tuan et al. |

(56) References Cited

U.S. PATENT DOCUMENTS

| | | |
|---|---|---|
| 10,979,871 B2 | 4/2021 | Hajimiri et al. |
| 10,999,269 B2 | 5/2021 | Bicket et al. |
| 10,999,374 B2 | 5/2021 | ElHattab et al. |
| 11,046,205 B1 | 6/2021 | Govan et al. |
| 11,069,257 B2 | 7/2021 | Palmer et al. |
| 11,080,568 B2 | 8/2021 | ElHattab et al. |
| 11,122,488 B1 | 9/2021 | Lloyd et al. |
| 11,126,910 B1 | 9/2021 | Akhtar et al. |
| 11,127,130 B1 | 9/2021 | Jain et al. |
| 11,131,986 B1 | 9/2021 | Gal et al. |
| 11,132,853 B1 | 9/2021 | Akhtar et al. |
| 11,137,744 B1 | 10/2021 | Heddleston et al. |
| 11,142,175 B2 | 10/2021 | Chow et al. |
| 11,158,177 B1 | 10/2021 | ElHattab et al. |
| 11,184,422 B1 | 11/2021 | Bicket et al. |
| 11,188,046 B1 | 11/2021 | ElHattab et al. |
| 11,190,373 B1 | 11/2021 | Stevenson et al. |
| 11,204,637 B2 | 12/2021 | Tuan et al. |
| 11,260,878 B2 | 3/2022 | Palmer et al. |
| 11,341,786 B1 | 5/2022 | Calmer et al. |
| 11,349,901 B1 | 5/2022 | Duffield et al. |
| 11,352,013 B1 | 6/2022 | Srinivasan et al. |
| 11,352,014 B1 | 6/2022 | Srinivasan et al. |
| 11,356,605 B1 | 6/2022 | Shemet et al. |
| 11,356,909 B1 | 6/2022 | Lloyd |
| 11,365,980 B1 | 6/2022 | Akhtar et al. |
| 11,386,325 B1 | 7/2022 | Srinivasan et al. |
| 11,393,227 B1 * | 7/2022 | Nishimura ............. G06V 20/58 |
| 11,436,844 B2 | 9/2022 | Carruthers et al. |
| 11,451,610 B1 | 9/2022 | Saunders et al. |
| 11,451,611 B1 | 9/2022 | Saunders et al. |
| 11,460,507 B2 | 10/2022 | Lloyd et al. |
| 11,464,079 B1 | 10/2022 | Aschenbener et al. |
| 11,479,142 B1 | 10/2022 | Govan et al. |
| 11,494,921 B2 | 11/2022 | ElHattab et al. |
| 11,522,857 B1 | 12/2022 | Symons et al. |
| 11,532,169 B1 | 12/2022 | Hassan et al. |
| 11,558,449 B1 | 1/2023 | Bicket et al. |
| 11,595,632 B2 | 2/2023 | Tsai et al. |
| 11,599,097 B1 | 3/2023 | Gal et al. |
| 11,606,736 B1 | 3/2023 | Lloyd et al. |
| 11,611,621 B1 | 3/2023 | ElHattab et al. |
| 11,615,141 B1 | 3/2023 | Hoye et al. |
| 11,620,909 B2 | 4/2023 | Tsai et al. |
| 11,627,252 B2 | 4/2023 | Delegard et al. |
| 11,641,388 B1 | 5/2023 | Saunders et al. |
| 11,641,604 B1 | 5/2023 | Lloyd |
| 11,643,102 B1 | 5/2023 | Calmer et al. |
| 11,659,060 B2 | 5/2023 | Davis et al. |
| 11,665,223 B1 | 5/2023 | Duffield et al. |
| 11,669,714 B1 | 6/2023 | Akhtar et al. |
| 11,671,478 B1 | 6/2023 | Saunders et al. |
| 11,674,813 B1 | 6/2023 | Chung et al. |
| 11,675,042 B1 | 6/2023 | Lloyd et al. |
| 11,683,579 B1 | 6/2023 | Symons et al. |
| 11,688,211 B1 | 6/2023 | Calmer et al. |
| 11,694,317 B1 | 7/2023 | Jain et al. |
| 11,704,984 B1 | 7/2023 | ElHattab et al. |
| 11,709,500 B2 | 7/2023 | Lloyd et al. |
| 11,710,409 B2 | 7/2023 | Nanda et al. |
| 11,720,087 B1 | 8/2023 | Heddleston et al. |
| 11,727,054 B2 | 8/2023 | Grandhi et al. |
| 11,731,469 B1 | 8/2023 | McGillan |
| 11,736,312 B1 | 8/2023 | Xiao et al. |
| 11,741,760 B1 | 8/2023 | Dubin et al. |
| 11,748,377 B1 | 9/2023 | Zhang et al. |
| 11,752,895 B1 | 9/2023 | Govan et al. |
| 11,756,346 B1 | 9/2023 | Wu et al. |
| 11,756,351 B1 | 9/2023 | Akhtar et al. |
| 11,758,096 B2 | 9/2023 | Shah et al. |
| 11,776,328 B2 | 10/2023 | Yang et al. |
| 11,780,446 B1 | 10/2023 | Srinivasan et al. |
| 11,782,930 B2 | 10/2023 | McGee et al. |
| 11,787,413 B2 | 10/2023 | Tsai et al. |
| 11,798,187 B2 | 10/2023 | Zaheer et al. |
| 11,798,298 B2 | 10/2023 | Hassan et al. |
| 11,800,317 B1 | 10/2023 | Dugar et al. |
| 11,838,884 B1 | 12/2023 | Dergosits et al. |
| 11,842,577 B1 | 12/2023 | Harrison et al. |
| 11,847,911 B2 | 12/2023 | ElHattab et al. |
| 11,855,801 B1 | 12/2023 | Stevenson et al. |
| 11,861,955 B1 | 1/2024 | Dubin et al. |
| 11,863,712 B1 | 1/2024 | Young et al. |
| 11,866,055 B1 | 1/2024 | Srinivasan et al. |
| 11,868,919 B1 | 1/2024 | Zhang et al. |
| 11,875,580 B2 | 1/2024 | Hassan et al. |
| 11,875,683 B1 | 1/2024 | Tsai et al. |
| 11,890,962 B1 | 2/2024 | Govan et al. |
| 11,937,152 B2 | 3/2024 | Hajimiri et al. |
| 11,938,948 B1 | 3/2024 | Davis et al. |
| 11,959,772 B2 | 4/2024 | Robbins et al. |
| 11,974,410 B1 | 4/2024 | Lin et al. |
| 11,975,685 B1 | 5/2024 | Innocenzi et al. |
| 11,989,001 B1 | 5/2024 | ElHattab et al. |
| 11,995,546 B1 | 5/2024 | Srinivasan et al. |
| 11,997,181 B1 | 5/2024 | Davis et al. |
| 12,000,940 B1 | 6/2024 | Lloyd et al. |
| 2002/0061758 A1 | 5/2002 | Zarlengo et al. |
| 2002/0128751 A1 | 9/2002 | Engstrom et al. |
| 2002/0169850 A1 | 11/2002 | Batke et al. |
| 2003/0081935 A1 | 5/2003 | Kirmuss |
| 2003/0154009 A1 | 8/2003 | Basir et al. |
| 2004/0093264 A1 | 5/2004 | Shimizu |
| 2004/0236476 A1 | 11/2004 | Chowdhary |
| 2004/0236596 A1 | 11/2004 | Chowdhary et al. |
| 2005/0131585 A1 | 6/2005 | Luskin et al. |
| 2005/0131646 A1 | 6/2005 | Camus |
| 2005/0286774 A1 | 12/2005 | Porikli |
| 2006/0167591 A1 | 7/2006 | McNally |
| 2007/0050108 A1 | 3/2007 | Larschan et al. |
| 2007/0173991 A1 | 7/2007 | Tenzer et al. |
| 2008/0252487 A1 | 10/2008 | McClellan et al. |
| 2008/0319602 A1 | 12/2008 | McClellan et al. |
| 2009/0099724 A1 | 4/2009 | Kranz et al. |
| 2009/0141939 A1 | 6/2009 | Chambers et al. |
| 2009/0240427 A1 | 9/2009 | Siereveld et al. |
| 2010/0030586 A1 | 2/2010 | Taylor et al. |
| 2010/0049639 A1 | 2/2010 | Ferro et al. |
| 2010/0281161 A1 | 11/2010 | Cohn et al. |
| 2011/0060496 A1 | 3/2011 | Nielsen et al. |
| 2011/0093306 A1 | 4/2011 | Nielsen et al. |
| 2011/0234749 A1 | 9/2011 | Alon |
| 2011/0276265 A1 | 11/2011 | Husain |
| 2012/0109418 A1 | 5/2012 | Lorber |
| 2012/0194357 A1 | 8/2012 | Ciolli |
| 2012/0201277 A1 | 8/2012 | Tanner et al. |
| 2012/0218416 A1 | 8/2012 | Leny et al. |
| 2012/0235625 A1 | 9/2012 | Takehara |
| 2012/0262104 A1 | 10/2012 | Kirsch |
| 2012/0303397 A1 | 11/2012 | Prosser |
| 2013/0073112 A1 | 3/2013 | Phelan et al. |
| 2013/0162421 A1 | 6/2013 | Inaguma et al. |
| 2013/0162425 A1 | 6/2013 | Raghunathan et al. |
| 2013/0164713 A1 | 6/2013 | Hunt et al. |
| 2013/0211559 A1 | 8/2013 | Lawson et al. |
| 2013/0244210 A1 | 9/2013 | Nath et al. |
| 2013/0250040 A1 | 9/2013 | Vitsnudel et al. |
| 2013/0332004 A1 | 12/2013 | Gompert et al. |
| 2014/0012492 A1 | 1/2014 | Bowers et al. |
| 2014/0095061 A1 | 4/2014 | Hyde |
| 2014/0098060 A1 | 4/2014 | McQuade et al. |
| 2014/0113619 A1 | 4/2014 | Tibbitts et al. |
| 2014/0159660 A1 | 6/2014 | Klose et al. |
| 2014/0195106 A1 | 7/2014 | McQuade et al. |
| 2014/0223090 A1 | 8/2014 | Malone |
| 2014/0278108 A1 | 9/2014 | Kerrigan et al. |
| 2014/0293069 A1 | 10/2014 | Lazar et al. |
| 2014/0328517 A1 | 11/2014 | Gluncic |
| 2014/0337429 A1 | 11/2014 | Asenjo et al. |
| 2014/0354227 A1 | 12/2014 | Tyagi et al. |
| 2014/0354228 A1 | 12/2014 | Williams et al. |
| 2015/0025734 A1 | 1/2015 | Cook et al. |
| 2015/0044641 A1 | 2/2015 | Chauncey et al. |
| 2015/0074091 A1 | 3/2015 | Walkin et al. |

(56) References Cited

U.S. PATENT DOCUMENTS

| | | |
|---|---|---|
| 2015/0116114 A1 | 4/2015 | Boyles |
| 2015/0189241 A1 | 7/2015 | Kim et al. |
| 2015/0226563 A1 | 8/2015 | Cox et al. |
| 2015/0283912 A1 | 10/2015 | Shimizu et al. |
| 2015/0347121 A1 | 12/2015 | Harumoto |
| 2016/0046298 A1 | 2/2016 | DeRuyck et al. |
| 2016/0110066 A1 | 4/2016 | McCormick et al. |
| 2016/0176401 A1 | 6/2016 | Pilkington |
| 2016/0275376 A1 | 9/2016 | Kant |
| 2016/0288744 A1 | 10/2016 | Rutherford et al. |
| 2016/0293049 A1 | 10/2016 | Monahan et al. |
| 2016/0343091 A1 | 11/2016 | Han et al. |
| 2016/0375780 A1 | 12/2016 | Penilla et al. |
| 2017/0039784 A1 | 2/2017 | Gelbart et al. |
| 2017/0060726 A1 | 3/2017 | Glistvain |
| 2017/0102463 A1 | 4/2017 | Hwang |
| 2017/0123397 A1 | 5/2017 | Billi et al. |
| 2017/0124476 A1 | 5/2017 | Levinson et al. |
| 2017/0140603 A1 | 5/2017 | Ricci |
| 2017/0195265 A1 | 7/2017 | Billi et al. |
| 2017/0200061 A1 | 7/2017 | Julian et al. |
| 2017/0263049 A1 | 9/2017 | MacDonald et al. |
| 2017/0263120 A1 | 9/2017 | Durie, Jr. et al. |
| 2017/0278004 A1 | 9/2017 | McElhinney et al. |
| 2017/0286838 A1 | 10/2017 | Cipriani et al. |
| 2017/0291611 A1 | 10/2017 | Innes et al. |
| 2017/0291800 A1 | 10/2017 | Scoville et al. |
| 2017/0323641 A1 | 11/2017 | Shimizu et al. |
| 2017/0332199 A1 | 11/2017 | Elliott et al. |
| 2017/0345283 A1 | 11/2017 | Kwon et al. |
| 2017/0366935 A1 | 12/2017 | Ahmadzadeh et al. |
| 2018/0001771 A1 | 1/2018 | Park et al. |
| 2018/0001899 A1 | 1/2018 | Shenoy et al. |
| 2018/0012196 A1 | 1/2018 | Ricci et al. |
| 2018/0025636 A1 | 1/2018 | Boykin et al. |
| 2018/0063576 A1 | 3/2018 | Tillman et al. |
| 2018/0068206 A1 | 3/2018 | Pollach et al. |
| 2018/0072313 A1 | 3/2018 | Stenneth |
| 2018/0075309 A1 | 3/2018 | Sathyanarayana et al. |
| 2018/0093672 A1 | 4/2018 | Terwilliger et al. |
| 2018/0174485 A1 | 6/2018 | Stankoulov |
| 2018/0234514 A1 | 8/2018 | Rajiv et al. |
| 2018/0247109 A1 | 8/2018 | Joseph et al. |
| 2018/0253109 A1 | 9/2018 | Fontaine et al. |
| 2018/0262724 A1 | 9/2018 | Ross |
| 2018/0295141 A1 | 10/2018 | Solotorevsky |
| 2018/0329381 A1 | 11/2018 | Doh et al. |
| 2018/0356800 A1 | 12/2018 | Chao et al. |
| 2018/0357484 A1 | 12/2018 | Omata |
| 2018/0364686 A1 | 12/2018 | Naidoo et al. |
| 2019/0003848 A1 | 1/2019 | Hoten et al. |
| 2019/0007690 A1 | 1/2019 | Varadarajan et al. |
| 2019/0028629 A1* | 1/2019 | Yoon ............... H04N 23/67 |
| 2019/0054876 A1 | 2/2019 | Ferguson et al. |
| 2019/0065951 A1 | 2/2019 | Luo et al. |
| 2019/0077308 A1 | 3/2019 | Kashchenko |
| 2019/0118655 A1 | 4/2019 | Grimes et al. |
| 2019/0120947 A1 | 4/2019 | Wheeler et al. |
| 2019/0174158 A1 | 6/2019 | Herrick et al. |
| 2019/0188847 A1 | 6/2019 | Gonzalez et al. |
| 2019/0244301 A1 | 8/2019 | Seth et al. |
| 2019/0257661 A1 | 8/2019 | Stentz et al. |
| 2019/0265712 A1 | 8/2019 | Satzoda et al. |
| 2019/0272725 A1 | 9/2019 | Viklund et al. |
| 2019/0286948 A1 | 9/2019 | Sathyanarayana et al. |
| 2019/0303718 A1 | 10/2019 | Tanigawa et al. |
| 2019/0304082 A1 | 10/2019 | Tokashiki et al. |
| 2019/0318419 A1 | 10/2019 | VanderZanden |
| 2019/0318549 A1 | 10/2019 | Zeira et al. |
| 2019/0327590 A1 | 10/2019 | Kubo et al. |
| 2019/0327613 A1 | 10/2019 | Bicket et al. |
| 2019/0370581 A1 | 12/2019 | Cordell et al. |
| 2020/0018612 A1 | 1/2020 | Wolcott |
| 2020/0026282 A1 | 1/2020 | Choe et al. |
| 2020/0050182 A1 | 2/2020 | Cheng et al. |
| 2020/0074326 A1 | 3/2020 | Balakrishnan et al. |
| 2020/0074397 A1 | 3/2020 | Burda et al. |
| 2020/0134870 A1 | 4/2020 | Ban |
| 2020/0139847 A1 | 5/2020 | Baumer et al. |
| 2020/0150739 A1 | 5/2020 | Tuan et al. |
| 2020/0162489 A1 | 5/2020 | Bar-Nahum et al. |
| 2020/0164509 A1 | 5/2020 | Shults et al. |
| 2020/0168094 A1 | 5/2020 | Shimodaira et al. |
| 2020/0283003 A1 | 9/2020 | Raichelgauz |
| 2020/0311602 A1 | 10/2020 | Hawley et al. |
| 2020/0312155 A1 | 10/2020 | Kelkar et al. |
| 2020/0327009 A1 | 10/2020 | Callison et al. |
| 2020/0327369 A1 | 10/2020 | Cruz et al. |
| 2020/0342230 A1 | 10/2020 | Tsai et al. |
| 2020/0342235 A1 | 10/2020 | Tsai et al. |
| 2020/0342274 A1 | 10/2020 | ElHattab et al. |
| 2020/0342506 A1 | 10/2020 | Levy et al. |
| 2020/0342611 A1 | 10/2020 | ElHattab et al. |
| 2020/0344301 A1 | 10/2020 | ElHattab et al. |
| 2020/0371773 A1 | 11/2020 | Kato et al. |
| 2020/0380806 A1 | 12/2020 | Tabata |
| 2020/0389415 A1 | 12/2020 | Zhao et al. |
| 2021/0006950 A1 | 1/2021 | Hajimiri et al. |
| 2021/0097315 A1 | 4/2021 | Carruthers et al. |
| 2021/0195166 A1* | 6/2021 | Tsai ............... H04N 23/631 |
| 2021/0397908 A1 | 12/2021 | ElHattab et al. |
| 2022/0165073 A1 | 5/2022 | Shikii et al. |
| 2022/0289203 A1 | 9/2022 | Makilya et al. |
| 2022/0374737 A1 | 11/2022 | Dhara et al. |
| 2023/0077207 A1 | 3/2023 | Hassan et al. |
| 2023/0153735 A1 | 5/2023 | Dhara et al. |
| 2023/0169420 A1 | 6/2023 | Dhara et al. |
| 2023/0219592 A1 | 7/2023 | Calmer et al. |
| 2023/0281553 A1 | 9/2023 | Singh et al. |
| 2023/0298410 A1 | 9/2023 | Calmer et al. |
| 2024/0003749 A1 | 1/2024 | Lin et al. |
| 2024/0005678 A1 | 1/2024 | Hassan et al. |
| 2024/0013423 A1 | 1/2024 | Zaheer et al. |
| 2024/0063596 A1 | 2/2024 | Pandian et al. |
| 2024/0146629 A1 | 5/2024 | Lloyd |

FOREIGN PATENT DOCUMENTS

| | | |
|---|---|---|
| EP | 1615178 A2 | 1/2006 |
| GB | 2288892 A | 11/1995 |
| WO | WO 2017/123665 A1 | 7/2017 |
| WO | WO 2018/131322 A1 | 7/2018 |
| WO | WO 2019/099409 A1 | 5/2019 |
| WO | WO 2019/125545 A1 | 6/2019 |
| WO | WO 2019/133533 A1 | 7/2019 |
| WO | WO 2023/244513 A1 | 12/2023 |

OTHER PUBLICATIONS

Dillon, A., "User Interface Design", MacMillan Encyclopedia of Cognitive Science, 2006, vol. 4, London: MacMillan, in 6 pages,(pp. 453-458). Downloaded from https://onlinelibrary.wiley.com/doi/10.1002/0470018860.s00054.

"Cargo Monitor", Samsara Inc., accessed Feb. 21, 2024 [publication date unknown], in 2 pages. URL: https://www.samsara.com/products/models/cargo-monitor.

"Connect your operations on the Samsara Platform.", Samsara Inc., [publication date unknown]. URL: https://www.samsara.com/products/platform/?gad_source=1&gclid=EAlalQobChMl14DWlofYgwMVaymtBh36cwx9EAAYASAAEgKjUfD_BwE#impact1 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

"Driver Scorecards & Fleet Safety" [archived webpage], KeepTruckin, Inc., accessed on Oct. 24, 2023 [archived on Apr. 23, 2019; publication date unknown], in 9 pages. URL: https://web.archive.org/web/20190423104921/https://keeptruckin.com/fleet-safety-and-coaching.

"Dual-Facing AI Dash Cam—CM32", Samsara Inc., accessed Feb. 7, 2024 [publication date unknown]. URL: https://www.samsara.

(56) References Cited

OTHER PUBLICATIONS com/ca/products/models/cm32/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"ELD Fact Sheet—English Version", Federal Motor Carrier Safety Administration, U.S. Department of Transportation, last updated Oct. 31, 2017 [publication date unknown], in 3 pages. URL: https://www.fmcsa.dot.gov/hours-service/elds/eld-fact-sheet-english-version.
"EM21—Environmental Monitor", Samsara Inc., accessed Feb. 21, 2024 [publication date unknown], in 5 pages. URL: https://www.samsara.com/uk/products/models/em21/.
"Fast Facts: Electronic Logging Device (ELD) Rule", Federal Motor Carrier Safety Administration, U.S. Department of Transportation, Jun. 2017, Document No. FMCSA-ADO-17-003 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
"Front-Facing AI Dash Cam—CM31", Samsara Inc., accessed Feb. 7, 2024 [publication date unknown]. URL: https://www.samsara.com/products/models/cm31/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"Guide: DRIVE risk score 101", Motive Technologies, Inc., [publication date unknown], Document No. 2022Q2_849898994 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 22 pages.
"KeepTruckin Expands Hardware Portfolio to Support Fleet Safety and Efficiency—New dual-facing dash camera and asset tracker deliver fleet safety and asset visibility", Business Wire, Sep. 9, 2019, in 4 pages. URL: https://www.businesswire.com/news/home/20190909005517/en/KeepTruckin-Expands-Hardware-Portfolio-to-Support-Fleet-Safety-and-Efficiency.
"KeepTruckin Launches New AI Dashcam Featuring Industry—Leading Accuracy to Proactively Prevent Accidents, Increase Safety and Efficiency", Business Wire, Aug. 12, 2021. URL: https://www.businesswire.com/news/home/20210812005612/en/KeepTruckin-Launches-New-AI-Dashcam-Featuring-Industry-Leading-Accuracy-to-Proactively-Prevent-Accidents-Increase-Safety-and-Efficiency (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
"Map and Tile Coordinates", Google for Developers, last updated Oct. 23, 2023 [retrieved on Oct. 24, 2023], in 5 pages. URL: https://developers.google.com/maps/documentation/javascript/coordinates.
"Meet Return on Traffic Data—The new potential for contextualized transportation analytics", Geotab ITS, accessed on Apr. 1, 2024 [publication date unknown], in 13 pages. URL: https://its.geotab.com/return-on-traffic-data/.
"Mobile Logbook for Drivers" [archived webpage], KeepTruckin, Inc., accessed on Feb. 5, 2024 [archived on Dec. 13, 2013; publication date unknown]. URL: https://web.archive.org/web/20131213071205/https:/keeptruckin.com/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
"Motive Announces AI Omnicam, the Industry's First AI-Enabled Camera Built for Side, Rear, Passenger, and Cargo Monitoring", Business Wire, Jun. 15, 2023, in 2 pages. URL: https://www.businesswire.com/news/home/20230615577887/en/Motive-Announces-AI-Omnicam-the-Industry%E2%80%99s-First-AI-Enabled-Camera-Built-for-Side-Rear-Passenger-and-Cargo-Monitoring.

"Product Brief: System Overview", Motive Technologies, Inc., [publication date unknown], Document No. 2022Q4_1203118185166511 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
"Product Brief: System Overview", Motive Technologies, Inc., [publication date unknown], Document No. 2022Q4_1203118185166511 (referenced in Jan. 24, 2024 Complaint, Case No. 1:24-cv-00084-UNA), in 3 pages. URL: https://gomotive.com/content-library/guides/system-overview/.
"Real-Time GPS Fleet Tracking" [archived webpage], KeepTruckin, Inc., accessed on Oct. 24, 2023 [archived on Apr. 8, 2019; publication date unknown], in 4 pages. URL: https://web.archive.org/web/20190408022059/https:/keeptruckin.com/gps-tracking.
"Samsara Vehicle Telematics—Fleet Technology That Goes Beyond GPS Tracking", Fleet Europe, Nexus Communication S.A., Oct. 11, 2022, in 7 pages. URL: https://www.fleeteurope.com/en/connected/europe/features/samsara-vehicle-telematics-fleet-technology-goes-beyond-gps-tracking?t%5B0%5D=Samsara&t%5B1%5D=Telematics&t%5B2%5D=Connectivity&curl=1.
"Smart Dashcam" [archived webpage], KeepTruckin, Inc., accessed on Oct. 24, 2023 [archived on Apr. 8, 2019; publication date unknown], in 8 pages. URL: https://web.archive.org/web/20190408015958/https:/keeptruckin.com/dashcam.
"Spec Sheet: AI Dashcam", Motive Technologies, Inc., [publication date unknown], Document No. 2023Q2_1204527643716537 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"Spec Sheet: AI Dashcam", Motive Technologies, Inc., [publication date unknown], Document No. 2023Q2_1205736073289732 (referenced in Jan. 24, 2024 Complaint, Case No. 1:24-cv-00084-UNA), in 5 pages. URL: https://gomotive.com/content-library/spec-sheet/ai-dashcam/.
"Spec Sheet: AI Omnicam", Motive Technologies, Inc., [publication date unknown], Document No. 2023Q2_1204519709838862 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"Spec Sheet: Smart Dashcam", Motive Technologies, Inc., [publication date unknown], Document No. 2022Q2_911703417 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
"Spec Sheet: Vehicle Gateway", Motive Technologies, Inc., [publication date unknown], Document No. 2022Q1_858791278 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 6 pages.
"Spec Sheet: Vehicle Gateway", Motive Technologies, Inc., [publication date unknown], Document No. 2022Q1_858791278 (referenced in Jan. 24, 2024 Complaint, Case No. 1:24-cv-00084-UNA), in 6 pages. URL: https://gomotive.com/content-library/spec-sheet/vehicle-gateway/.
"Vehicle Gateway", Samsara Inc., [publication date unknown]. URL: https://www.samsara.com/products/models/vehicle-gateway (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"The Home of Actionable Transportation Insights—Meet Altitude", Geotab ITS, accessed on Apr. 1, 2024 [publication date unknown], in 5 pages. URL: https://its.geotab.com/altitude/.
"Transform your business with the Connected Operations™ Cloud", Samsara Inc., accessed Feb. 21, 2024 [publication date unknown], in 8 pages. URL: https://www.samsara.com/products/platform/#impact0.

(56) References Cited

OTHER PUBLICATIONS

24/7 Staff, "KeepTruckin Raises $18 Million as Silicon Valley Eyes Trucking Industry", Supply Chain 24/7, May 23, 2017. URL: https://www.supplychain247.com/article/keeptruckin_raises_18_million_as_silicon_valley_eyes_trucking_industry/CSA (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 1 page.

Brown, P. et al., "AI Dash Cam Benchmarking" [report], Strategy Analytics, Inc., Apr. 15, 2022, in 27 pages.

Camden, M. et al., "AI Dash Cam Performance Benchmark Testing Final Report", Virginia Tech Transportation Institute, revised Aug. 17, 2023 [submitted Jun. 30, 2023] (filed with Jan. 24, 2024 Complaint, Case No. 1:24-cv-00084-UNA), in 110 pages.

Camden, M. et al., "AI Dash Cam Performance Benchmark Testing Final Report", Virginia Tech Transportation Institute, submitted Jun. 30, 2023 (filed with Jan. 24, 2024 Complaint, Case No. 1:24-cv-00084-UNA), in 109 pages.

Geraci, B., "It's been one year since we launched the Motive AI Dashcam. See how it's only gotten better.", Motive Technologies, Inc., Oct. 13, 2022, in 5 pages. URL: https://gomotive.com/blog/motive-ai-dashcam-year-one/.

Green, A., "Logistics Disruptors: Motive's Shoaib Makani on AI and automation", McKinsey & Company, Sep. 6, 2022, in 7 pages. URL: https://www.mckinsey.com/industries/travel-logistics-and-infrastructure/our-insights/logistics-disruptors-motives-shoaib-makani-on-ai-and-automation.

Hanson, Kelly, "Introducing Motive's Safety Hub for accident prevention and exoneration.", Motive Technologies, Inc., Aug. 18, 2020, in 6 pages. URL: https://gomotive.com/blog/motive-safety-hub/.

Haridas, S., "KeepTruckin Asset Gateway Review", Truck Trailer Tracker, Nov. 16, 2020, in 7 pages. URL: https://trucktrailertracker.com/keeptruckin-asset-gateway-review/.

Horowitz, E. "Improve Fleet Safety with Samsara", Samsara Inc., Aug. 25, 2017, in 4 pages. URL: https://www.samsara.com/ca/blog/improve-fleet-safety-with-samsara/.

Khan, M., "Why and How We Measure Driver Performance", Medium, Jan. 14, 2020. URL: https://medium.com/motive-eng/why-and-how-we-measure-driver-performance-768d5316fb2c#:~:text=By%20studying%20data%20gathered%20from,the%20driver%20a%20safety%20score (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 8 pages.

Kinney, J., "Timeline of the ELD Mandate: History & Important Dates", GPS Trackit, May 3, 2017. URL: https://gpstrackit.com/blog/a-timeline-of-the-eld-mandate-history-and-important-dates/ (filed with Feb. 8, 2024 ITC Complaint, In the Matter of Certain Vehicle Telematics, Fleet Management, and Video- Based Safety Systems, Devices, and Components thereof, Investigation No. 337-TA-3722), in 5 pages.

Motive Help Center, "*New Fleet Managers Start Here*—Getting Started with Motive for Fleet Managers", Motive Technologies, Inc., accessed on Oct. 24, 2023 [publication date unknown], in 2 pages. URL: https://helpcenter.gomotive.com/hc/en-us/articles/6162442580893--New-Fleet-Managers-Start-Here-Getting-Started-with-Motive-for-Fleet-Managers.

Motive Help Center, "How to add a vehicle on the Fleet Dashboard", Motive Technologies, Inc., accessed on Oct. 25, 2023 [publication date unknown], in 6 pages. URL: https://helpcenter.gomotive.com/hc/en-us/articles/6208623928349.

Motive Help Center, "How to assign an Environmental Sensor to Asset Gateway", Motive Technologies, Inc., accessed on Oct. 24, 2023 [publication date unknown], in 11 pages. URL: https://helpcenter.gomotive.com/hc/en-us/articles/6908982681629.

Motive Help Center, "How to create a Geofence", Motive Technologies, Inc., accessed on Oct. 24, 2023 [publication date unknown], in 5 pages. URL: https://helpcenter.gomotive.com/hc/en-us/articles/6162211436061-How-to-create-a-Geofence.

Motive Help Center, "How to create Alert for Geofence", Motive Technologies, Inc., accessed on Oct. 24, 2023 [publication date unknown], in 10 pages. URL: https://helpcenter.gomotive.com/hc/en-us/articles/6190688664733-How-to-create-Alert-for-Geofence.

Motive Help Center, "How to enable Dashcam In-cab Alerts for a Vehicle?", Motive Technologies, Inc., accessed on Feb. 7, 2024 [publication date unknown]. URL: https://helpcenter.gomotive.com/hc/en-us/articles/11761978874141-How-to-enable-Dashcam-In-cab-Alerts-for-a-Vehicle (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Motive Help Center, "How to enable Event Severity", Motive Technologies, Inc., accessed on Oct. 24, 2023 [publication date unknown], in 3 pages. URL: https://helpcenter.gomotive.com/hc/en-us/articles/7123375017757-How-to-enable-Event-Severity.

Motive Help Center, "How to enable In-Cab audio alerts on the Motive Fleet Dashboard", Motive Technologies, Inc., accessed on Oct. 25, 2023 [publication date unknown], in 4 pages. URL: https://helpcenter.gomotive.com/hc/en-us/articles/6176882285469.

Motive Help Center, "How to install Environmental Sensors", Motive Technologies, Inc., accessed on Oct. 24, 2023 [publication date unknown], in 4 pages. URL: https://helpcenter.gomotive.com/hc/en-us/articles/6907777171613.

Motive Help Center, "How to Manage a Group and Sub-groups", Motive Technologies, Inc., accessed on Oct. 24, 2023 [publication date unknown], in 4 pages. URL: https://helpcenter.gomotive.com/hc/en-us/articles/6189047187997-How-to-Manage-A-Group-and-Sub-groups.

Motive Help Center, "How to manage Fuel Hub Vehicle Details", Motive Technologies, Inc., accessed on Oct. 24, 2023 [publication date unknown], in 5 pages. URL: https://helpcenter.gomotive.com/hc/en-us/articles/6190039573789-How-to-manage-Fuel-Hub-Vehicle-Details.

Motive Help Center, "How to modify/ set up custom safety events thresholds", Motive Technologies, Inc., accessed on Oct. 24, 2023 [publication date unknown], in 4 pages. URL: https://helpcenter.gomotive.com/hc/en-us/articles/6162556676381-How-to-set-up-Custom-Safety-Event-Thresholds-for-vehicles.

Motive Help Center, "How to monitor Fleet's Speeding behavior", Motive Technologies, Inc., accessed on Oct. 24, 2023 [publication date unknown], in 4 pages. URL: https://helpcenter.gomotive.com/hc/en-us/articles/6189068876701-How-to-monitor-fleet-s-Speeding-behavior.

Motive Help Center, "How to recall/request video from the Motive Fleet Dashboard?", Motive Technologies, Inc., accessed on Oct. 25, 2023 [publication date unknown], in 7 pages. URL: https://helpcenter.gomotive.com/hc/en-us/articles/6162075219229-How-to-recall-request-video-from-the-Motive-Dashcam.

Motive Help Center, "How to record Hours of Service (HOS) with Vehicle Gateway", Motive Technologies, Inc., accessed on Oct. 24, 2023 [publication date unknown], in 3 pages. URL: https://helpcenter.gomotive.com/hc/en-us/articles/6162505072157-How-to-record-Hours-of-Service-HOS-with-Vehicle-Gateway.

Motive Help Center, "How to set a custom Speed Limit", Motive Technologies, Inc., accessed on Oct. 24, 2023 [publication date unknown], in 5 pages. URL: https://helpcenter.gomotive.com/hc/en-us/articles/8866852210205-How-to-set-a-custom-Speed-Limit.

Motive Help Center, "How to Set Real-Time Speeding Alerts on the Fleet Dashboard", Motive Technologies, Inc., accessed on Oct. 24, 2023 [publication date unknown], in 7 pages. URL: https://helpcenter.gomotive.com/hc/en-us/articles/6175738246557-How-to-Set-Real-Time-Speeding-Alerts-on-the-Fleet-Dashboard.

Motive Help Center, "How to set up Custom Safety Event Thresholds for vehicles", Motive Technologies, Inc., accessed on Mar. 13, 2023 [publication date unknown], in 6 pages. URL: https://helpcenter.gomotive.com/hc/en-us/articles/6162556676381-How-to-set-up-Custom-Safety-Event-Thresholds-for-vehicles.

Motive Help Center, "How to track vehicle speed from the Motive Fleet Dashboard", Motive Technologies, Inc., accessed on Oct. 24, 2023 [publication date unknown], in 4 pages. URL: https://helpcenter.

(56) References Cited

OTHER PUBLICATIONS gomotive.com/hc/en-us/articles/6189043119261-How-to-track-vehicle-speed-from-the-Motive-Fleet-Dashboard.

Motive Help Center, "How to unpair and repair Environmental Sensors", Motive Technologies, Inc., accessed on Oct. 24, 2023 [publication date unknown], in 3 pages. URL: https://helpcenter.gomotive.com/hc/en-us/articles/6905963506205-How-to-unpair-and-repair-Environmental-Sensors.

Motive Help Center, "How to view a Safety Event", Motive Technologies, Inc., accessed on Oct. 25, 2023 [publication date unknown], in 4 pages. URL: https://helpcenter.gomotive.com/hc/en-us/articles/6189410468509-How-to-view-a-Safety-Event.

Motive Help Center, "How to view Fleet DRIVE Score Report on Fleet Dashboard", Motive Technologies, Inc., accessed on Feb. 7, 2024 [publication date unknown]. URL: https://helpcenter.gomotive.com/hc/en-us/articles/13200798670493-How-to-view-Fleet-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view Fuel Hub Driver Details", Motive Technologies, Inc., [publication date unknown]. URL: https://helpcenter.gomotive.com/hc/en-us/articles/6173246145053-How-to-view-Fuel-Hub-Driver-Details (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

Motive Help Center, "How to view Fuel Hub Driver Details", Motive Technologies, Inc., accessed on Oct. 24, 2023 [publication date unknown], in 7 pages. URL: https://helpcenter.gomotive.com/hc/en-us/articles/6173246145053-How-to-view-Fuel-Hub-Driver-Details.

Motive Help Center, "How to view Group DRIVE Score Report on Fleet Dashboard", Motive Technologies, Inc., accessed on Feb. 7, 2024 [publication date unknown]. URL: https://helpcenter.gomotive.com/hc/en-us/articles/12743858622365-How-to-view-Group-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view safety events report", Motive Technologies, Inc., accessed on Oct. 24, 2023 [publication date unknown], in 2 pages. URL: https://helpcenter.gomotive.com/hc/en-us/articles/6190647741853-How-to-view-safety-events-report.

Motive Help Center, "How to view Stop Sign Violation events on Fleet Dashboard", Motive Technologies, Inc., accessed on Feb. 7, 2024 [publication date unknown]. URL: https://helpcenter.gomotive.com/hc/en-us/articles/6163732277917-How-to-view-Stop-Sign-Violation-events-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view Stop Sign Violation events on Fleet Dashboard", Motive Technologies, Inc., accessed on Oct. 24, 2023 [publication date unknown], in 2 pages. URL: https://helpcenter.gomotive.com/hc/en-us/articles/6163732277917-How-to-view-Stop-Sign-Violation-events-on-Fleet-Dashboard.

Motive Help Center, "How to view the Driver DRIVE Score Report", Motive Technologies, Inc., accessed on Feb. 7, 2024 [publication date unknown]. URL: https://helpcenter.gomotive.com/hc/en-us/articles/13200710733853-How-to-view-the-Driver-DRIVE-Score-Report (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view the Safety Hub and DRIVE Score details in the DriverApp", Motive Technologies, Inc., accessed on Oct. 24, 2023 [publication date unknown], in 5 pages. URL: https://helpcenter.gomotive.com/hc/en-us/articles/6162215453853-How-to-view-safety-events-and-Dashcam-videos-on-Motive-App.

Motive Help Center, "How to view your vehicle's Utilization details", Motive Technologies, Inc., accessed on Feb. 7, 2024 [publication date unknown]. URL: https://helpcenter.gomotive.com/hc/en-us/articles/6176914537373-How-to-view-your-vehicle-s-Utilization-details (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Motive Help Center, "Viewing Close Following Events on the Motive Fleet Dashboard", Motive Technologies, Inc., accessed on Oct. 24, 2023 [publication date unknown], in 7 pages. URL: https://helpcenter.gomotive.com/hc/en-us/articles/6189574616989-Viewing-Close-Following-Events-on-the-Motive-Fleet-Dashboard.

Motive Help Center, "What are Alert Types?", Motive Technologies, Inc., accessed on Oct. 24, 2023 [publication date unknown], in 3 pages. URL: https://helpcenter.gomotive.com/hc/en-us/articles/8239240188957-What-are-Alert-Types-.

Motive Help Center, "What are Environmental Sensors?", Motive Technologies, Inc., accessed on Oct. 24, 2023 [publication date unknown], in 4 pages. URL: https://helpcenter.gomotive.com/hc/en-us/articles/6907551525661-What-are-Environmental-Sensors-.

Motive Help Center, "What are safety risk tags?", Motive Technologies, Inc., accessed on Feb. 21, 2024 [publication date unknown], in 4 pages. URL: https://helpcenter.gomotive.com/hc/en-us/articles/6163713841053.

Motive Help Center, "What are the definitions of safety behaviors triggered by Motive's AI & Smart Dashcams", Motive Technologies, Inc., accessed on Mar. 13, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are the definitions of safety behaviors triggered by Motive's AI & Smart Dashcams", Motive Technologies, Inc., accessed on Oct. 24, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are unsafe behaviors?", Motive Technologies, Inc., accessed on Mar. 13, 2023 [publication date unknown], in 4 pages. URL (archived version): https://web.archive.org/web/20230203093145/https://helpcenter.gomotive.com/hc/en-us/articles/6858636962333-What-are-unsafe-behaviors-.

Motive Help Center, "What are Vehicle Gateway Malfunctions and Data Diagnostics", Motive Technologies, Inc., accessed on Oct. 24, 2023 [publication date unknown], in 4 pages. URL: https://helpcenter.gomotive.com/hc/en-us/articles/6160848958109-What-are-Vehicle-Gateway-Malfunctions-and-Data-Diagnostics.

Motive Help Center, "What is DRIVE Risk Score?", Motive Technologies, Inc., accessed on Oct. 24, 2023 [publication date unknown], in 5 pages. URL: https://helpcenter.gomotive.com/hc/en-us/articles/6162164321693-What-is-DRIVE-risk-score-.

Motive Help Center, "What is DRIVE Risk Score?", Motive Technologies, Inc., accessed on Oct. 24, 2023 [publication date unknown]. URL: https://helpcenter.gomotive.com/hc/en-us/articles/6162164321693-What-is-DRIVE-risk-score- (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

Motive Help Center, "What is Event Severity?", Motive Technologies, Inc., accessed on Oct. 24, 2023 [publication date unknown], in 3 pages. URL: https://helpcenter.gomotive.com/hc/en-us/articles/6176003080861-What-is-Event-Severity-.

Motive Help Center, "What is Fuel Hub?", Motive Technologies, Inc., accessed on Feb. 5, 2024 [publication date unknown]. URL: https://helpcenter.gomotive.com/hc/en-us/articles/6161577899165-What-is-Fuel-Hub (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.

Motive Help Center, "What is Fuel Hub?", Motive Technologies, Inc., accessed on Oct. 24, 2023 [publication date unknown], in 9 pages. URL: https://helpcenter.gomotive.com/hc/en-us/articles/6161577899165-What-is-Fuel-Hub-.

(56) References Cited

OTHER PUBLICATIONS

Motive Help Center, "What is Motive Fleet App?", Motive Technologies, Inc., accessed on Oct. 24, 2023 [publication date unknown], in 12 pages. URL: https://helpcenter.gomotive.com/hc/en-us/articles/6113996661917-What-is-Motive-Fleet-App-.

Motive Help Center, "What is Safety Hub?", Motive Technologies, Inc., accessed on Oct. 24, 2023 [publication date unknown], in 10 pages. URL: https://helpcenter.gomotive.com/hc/en-us/articles/6162472353053-What-is-Safety-Hub-.

Motive Help Center, "What Motive fuel features are available?", Motive Technologies, Inc., accessed on Oct. 24, 2023 [publication date unknown], in 2 pages. URL: https://helpcenter.gomotive.com/hc/en-us/articles/6189158796445-What-Motive-fuel-features-are-available-.

Motive Help Center, "What unsafe behaviors does Motive monitor through Dashcam and Vehicle Gateway?", Motive Technologies, Inc., accessed on Feb. 21, 2024 [publication date unknown], in 5 pages. URL: https://helpcenter.gomotive.com/hc/en-us/articles/6858636962333-What-unsafe-behaviors-does-Motive-monitor-through-Dashcam-and-Vehicle-Gateway-#01HCB72T2EXXW3FFVJ1XSDEG77.

Motive Help Center, "What unsafe behaviors does Motive monitor through Dashcam and Vehicle Gateway?", Motive Technologies, Inc., accessed on Oct. 25, 2023 [publication date unknown], in 4 pages. URL: https://helpcenter.gomotive.com/hc/en-us/articles/6858636962333-What-are-unsafe-behaviors-.

Motive, "AI dash cam comparison: Motive, Samsara, Lytx", Motive Technologies, Inc., [publication date unknown]. URL: https://gomotive.com/products/dashcam/fleet-dash-cam-comparison/#seatbelt-use (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.

Motive, "AI dash cam comparison: Motive, Samsara, Lytx", Motive Technologies, Inc., accessed on Feb. 18, 2024 [publication date unknown], in 20 pages. URL: https://gomotive.com/products/dashcam/fleet-dash-cam-comparison/.

Motive, "Asset Gateway Installation Guide | Cable/Vehicle Powered" [video], YouTube, Jun. 25, 2020, screenshot in 1 page. URL: https://www.youtube.com/watch?v=pME-VMauQgY.

Motive, "Asset Gateway Installation Guide | Solar Powered" [video], YouTube, Jun. 25, 2020, screenshot in 1 page. URL: https://www.youtube.com/watch?v=jifKM3GT6Bs.

Motive, "Benchmarking AI Accuracy for Driver Safety" [video], YouTube, Apr. 21, 2022, screenshot in 1 page. URL: https://www.youtube.com/watch?v=brRt2h0J80E.

Motive, "CEO Shoaib Makani's email to Motive employees.", Motive Technologies, Inc., Dec. 7, 2022, in 5 pages. URL: https://gomotive.com/blog/shoaib-makanis-message-to-employees/.

Motive, "Coach your drivers using the Motive Safety Hub." [video], YouTube, Mar. 27, 2023, screenshot in 1 page. URL: https://www.youtube.com/watch?v=VeErPXF30js.

Motive, "Equipment and trailer monitoring", Motive Technologies, Inc., accessed on Feb. 18, 2024 [publication date unknown], in 11 pages. URL: https://gomotive.com/products/tracking-telematics/trailer-tracking/.

Motive, "Experts agree, Motive is the most accurate, fastest AI dash cam.", Motive Technologies, Inc., accessed Feb. 21, 2024 [publication date unknown] in 16 pages. URL: https://gomotive.com/products/dashcam/best-dash-cam/.

Motive, "Guide: AI Model Development", Motive Technologies, Inc., accessed on Mar. 29, 2024 [publication date unknown], Document No. 2022Q1_849898994, in 14 pages.

Motive, "Guide: DRIVE risk score", Motive Technologies, Inc., accessed on Apr. 8, 2023 [publication date unknown], Document No. 2022Q2_849898994, in 22 pages.

Motive, "Guide: Smart Event Thresholds", Motive Technologies, Inc., accessed on Apr. 8, 2023 [publication date unknown], Document No. 2022Q1_902914404, in 11 pages.

Motive, "How to install a Motive Vehicle Gateway in light-duty vehicles." [video], YouTube, Aug. 5, 2022, screenshot in 1 page. URL: https://www.youtube.com/watch?v=WnclRs_cFw0.

Motive, "How to install your Motive AI Dashcam." [video], YouTube, Aug. 5, 2022, screenshot in 1 page. URL: https://www.youtube.com/watch?v=3JNG2h3KnU4.

Motive, "IFTA fuel tax reporting", Motive Technologies, Inc., accessed on Feb. 18, 2024 [publication date unknown], in 4 pages. URL: https://gomotive.com/products/fleet-compliance/ifta-fuel-tax-reporting/.

Motive, "Improve road and fleet safety with driver scores.", Motive Technologies, Inc., Feb. 7, 2019, in 5 pages. URL: https://gomotive.com/blog/improve-fleet-safety-driver-scores/.

Motive, "Industry-leading fleet management solutions", Motive Technologies, Inc., accessed on Feb. 18, 2024 [publication date unknown], in 13 pages. URL: https://gomotive.com/products/.

Motive, "Introducing an easier way to manage unidentified trips.", Motive Technologies, Inc., Apr. 30, 2020, in 5 pages. URL: https://gomotive.com/blog/introducing-easier-ude-management/.

Motive, "Introducing Motive Driver Workflow.", Motive Technologies, Inc., Oct. 16, 2017, in 5 pages. URL: https://gomotive.com/blog/motive-driver-workflow/.

Motive, "Introducing the Motive Asset Gateway and dual-facing Smart Dashcam.", Motive Technologies, Inc., Sep. 9, 2019, in 5 pages. URL: https://gomotive.com/blog/trailer-tracking-and-dual-facing-dash-cam-introducing/.

Motive, "Introducing the Motive Smart Dashcam", Motive Technologies, Inc., Jun. 6, 2018. URL: https://gomotive.com/blog/announcing-smart-dashcam (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.

Motive, "KeepTruckin ELD Training for Drivers" [video], YouTube, Feb. 2, 2018, screenshot in 1 page. URL: https://www.youtube.com/watch?v=LKJLIT2bGS0.

Motive, "Keep Truckin Smart Dashcam" [video], Facebook, Jun. 6, 2018. URL: https://www.facebook.com/keeptrucking/videos/keeptrucking-smart-dashcam/10212841352048331/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Motive, "Motive Fleet View | Advanced GPS system for live and historical fleet tracking." [video], YouTube, Jan. 23, 2023, screenshot in 1 page. URL: https://www.youtube.com/watch?v=CSDiDZhjVOQ.

Motive, "Motive introduces Reefer Monitoring for cold chain logistics.", Motive Technologies, Inc., Oct. 4, 2022, in 5 pages. URL: https://gomotive.com/blog/motive-introduces-reefer-monitoring-for-cold-chain-logistics/.

Motive, "Motive Reefer Monitoring for cold chain logistics." [video], YouTube, Oct. 5, 2022, screenshot in 1 page. URL: https://www.youtube.com/watch?v=rDwS5AmQp-M.

Motive, "Motive Smart Load Board—designed to help you find the right loads faster." [video], YouTube, Nov. 28, 2022, screenshot in 1 page. URL: https://www.youtube.com/watch?v=UF2EQBzLYYk.

Motive, "Motive vs. Samsara: What's the difference?", Motive Technologies, Inc., accessed Feb. 21, 2024 [publication date unknown], in 16 pages. URL: https://gomotive.com/motive-vs-samsara/#compare-chart.

Motive, "No time for downtime—automate fleet maintenance schedules" [video], YouTube, Dec. 20, 2022, screenshot in 1 page. URL: https://www.youtube.com/watch?v=flUccP-ifaU.

Motive, "Product Brief: Driver Safety", Motive Technologies, Inc., accessed on Oct. 24, 2023 [publication date unknown], Document No. 2023Q2_1204527735206670, in 4 pages.

Motive, "Product Brief: System Overview", Motive Technologies, Inc., accessed on Oct. 24, 2023 [publication date unknown], Document No. 2022Q4_1203331000367178, in 4 pages.

Motive, "Product Brief: Tracking & Telematics", Motive Technologies, Inc., accessed on Oct. 24, 2023 [publication date unknown], Document No. 2022Q3_1202933457877590, in 4 pages.

Motive, "Products | AI Dashcam—Smart, accurate, and responsive AI dash cams.", Motive Technologies, Inc., [publication date unknown]. URL: https://gomotive.com/products/dashcam/ (filed with Feb. 8,

(56) References Cited

OTHER PUBLICATIONS

2024 ITC Complaint, In the Matter of Certain Vehicle Telematics, Fleet Management, and Video-Based Safety Systems, Devices, and Components thereof, Investigation No. 337-TA-3722), in 7 pages.
Motive, "Products | AI Dashcam—Smart, accurate, and responsive AI dash cams.", Motive Technologies, Inc., accessed on Feb. 18, 2024 [publication date unknown], in 9 pages. URL: https://gomotive.com/products/dashcam/.
Motive, "Products | Dispatch—Manage your dispatches with ease.", Motive Technologies, Inc., accessed on Feb. 18, 2024 [publication date unknown], in 9 pages. URL: https://gomotive.com/products/dispatch-workflow/.
Motive, "Products | Driver Safety—Protect your fleet and profits with an all-in-one safety solution.", Motive Technologies, Inc., accessed on Feb. 18, 2024 [publication date unknown], in 13 pages. URL: https://gomotive.com/products/driver-safety/.
Motive, "Products | Driver Safety—Protect your fleet and profits with an all-in-one safety solution.", Motive Technologies, Inc., accessed on Feb. 5, 2024 [publication date unknown]. URL: https://gomotive.com/products/driver-safety/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 16 pages.
Motive, "Products | Platform—Everything you need to manage your fleet. In one place.", Motive Technologies, Inc., accessed on Feb. 7, 2024 [publication date unknown]. URL: https://gomotive.com/products/platform/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 12 pages.
Motive, "Products | Reefer Monitoring—The strongest link in cold chain transportation.", Motive Technologies, Inc., accessed on Feb. 18, 2024 [publication date unknown], in 8 pages. URL: https://gomotive.com/products/reefer-monitoring-system/.
Motive, "Products | Tracking & Telematics—Track and monitor your fleet.", Motive Technologies, Inc., accessed on Feb. 18, 2024 [publication date unknown], in 11 pages. URL: https://gomotive.com/products/tracking-telematics/.
Motive, "Spec Sheet: AI Dashcam", Motive Technologies, Inc., accessed on Oct. 24, 2023 [publication date unknown], Document No. 2022Q3_1202788858717595, in 5 pages.
Motive, "Spec Sheet: Asset Gateway", Motive Technologies, Inc., accessed on Mar. 15, 2023 [publication date unknown], Document No. 2022Q1_849551229, in 6 pages.
Motive, "Take control of your fleet with Groups and Features Access.", Motive Technologies, Inc., Apr. 4, 2017, in 3 pages. URL: https://gomotive.com/blog/take-control-fleet-groups-features-access/.
Motive, "Take the time and hassle out of IFTA fuel tax reporting with Motive's fleet card." [video], YouTube, Jan. 26, 2023, screenshot in 1 page. URL: https://www.youtube.com/watch?v=OEN9Q8X3j6I.
Motive, "The most accurate AI just got better.", Motive Technologies, Inc., Mar. 8, 2023, in 8 pages. URL: https://gomotive.com/blog/fewer-fleet-accidents-with-the-new-ai/.
Motive, "The Motive Driver App: Change current duty status in your driving log." [video], YouTube, Aug. 10, 2022, screenshot in 1 page. URL: https://www.youtube.com/watch?v=m4HPnM8BLBU.
Motive, "The Motive Driver App: Claim and correct unidentified trips." [video], YouTube, Sep. 13, 2022, screenshot in 1 page. URL: https://www.youtube.com/watch?v=z2_kxd3dRac.
Motive, "The Motive Driver App: Connect to the Vehicle Gateway." [video], YouTube, Sep. 13, 2022, screenshot in 1 page. URL: https://www.youtube.com/watch?v=egZmLYDa3kE.
Motive, "The Motive Driver App: Creating fleet vehicle inspection reports." [video], YouTube, Aug. 10, 2022, screenshot in 1 page. URL: https://www.youtube.com/watch?v=u1JI-rZhbdQ.
Motive, "The Motive Driver App: Digitally record hours of service (HOS)." [video], YouTube, Aug. 10, 2022, screenshot in 1 page. URL: https://www.youtube.com/watch?v=gdexlb_zqtE.
Motive, "The Motive Driver App: Insert past duty driving log status." [video], YouTube, Aug. 10, 2022, screenshot in 1 page. URL: https://www.youtube.com/watch?v=TmOipFKPBeY.
Motive, "The Motive Driver App: Switch to DOT inspection mode to share driving logs." [video], YouTube, Aug. 10, 2022, screenshot in 1 page. URL: https://www.youtube.com/watch?v=S2LR1ZUImBU.
Motive, "The Motive Driver App: View hours of service (HOS) violations." [video], YouTube, Aug. 10, 2022, screenshot in 1 page. URL: https://www.youtube.com/watch?v=qJX2ZiBGtV8.
Motive, "U.S. speed limits. What drivers and fleets need to know.", Motive Technologies, Inc., Jan. 13, 2022, in 8 pages. URL: https://gomotive.com/blog/us-speed-limits-for-drivers/.
Motive, "What is an AI dashcam?", Motive Technologies, Inc., Jan. 21, 2022, in 6 pages. URL: https://gomotive.com/blog/what-is-ai-dashcam/.
Motive, "WiFi Hotspot sets you free from restrictive cell phone data plans.", Motive Technologies, Inc., Jun. 27, 2019, in 5 pages. URL: https://gomotive.com/blog/wifi-hotspot/.
Motive, "WiFi Hotspot", Motive Technologies, Inc., accessed on Feb. 18, 2024 [publication date unknown], in 5 pages. URL: https://gomotive.com/products/wifi-hotspot/.
Samsara Support, "AI Event Detection", Samsara Inc., accessed on Feb. 7, 2024 [publication date unknown]. URL: https://kb.samsara.com/hc/en-us/articles/360043619011-AI-Event-Detection#UUID-4790b62c-6987-9c06-28fe-c2e2a4fbbb0d (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Alert Configuration", Samsara Inc., accessed Feb. 7, 2024 [publication date unknown]. URL: https://kb.samsara.com/hc/en-us/articles/217296157-Alert-Configuration (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Samsara Support, "Alert Triggers", Samsara Inc., accessed Feb. 7, 2024 [publication date unknown]. URL: https://kb.samsara.com/hc/en-us/articles/360043113772-Alert-Triggers (filed with Feb. 8, 20248 ITC Complaint, In the Matter of Certain Vehicle Telematics, Fleet Management, and Video-Based Safety Systems, Devices, and Components thereof, Investigation No. 337-TA-3722), in 6 pages.
Samsara Support, "Automatic Driver Detection (Camera ID)", Samsara Inc., accessed on Feb. 7, 2024 [publication date unknown]. URL: https://kb.samsara.com/hc/en-us/articles/360042878172#UUID-294cf192-f2f6-2c5a-3221-9432288c9b25 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Dash Cam Recording Logic", Samsara Inc., accessed on Feb. 7, 2024 [publication date unknown]. URL: https://kb.samsara.com/hc/en-us/articles/360011372211-Dash-Cam-Recording-Logic (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara Support, "Dash Cam Settings Overview", Samsara Inc., accessed on Feb. 7, 2024 [publication date unknown]. URL: https://kb.samsara.com/hc/en-us/articles/360042037572-Dash-Cam-Settings-Overview (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Rolling Stop Detection", Samsara Inc., accessed on Feb. 7, 2024 [publication date unknown]. URL: https://kb.samsara.com/hc/en-us/articles/360029629972-Rolling-Stop-Detection (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara Support, "Safety Score Categories and Calculation", Samsara Inc., [publication date unknown]. URL: https://kb.samsara.com/hc/en-us/articles/360045237852-Safety-Score-Categoriesand-Calculation (filed with Feb. 8, 2024 ITC Complaint, In the Matter

(56) References Cited

OTHER PUBLICATIONS of Certain Vehicle Telematics, Fleet Management, and Video-Based Safety Systems, Devices, and Components thereof, Investigation No. 337-TA-3722), in 3 pages.
Samsara Support, "Safety Score Weights and Configuration", Samsara Inc., accessed Feb. 7, 2024 [publication date unknown]. URL: https://kb.samsara.com/hc/en-us/articles/360043160532-Safety-Score-Weights-and-Configuration#UUID-fcb096dd-79d6-69fc-6aa8-5192c665be0a_sectionidm458564145580163323842957870 4 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
Samsara, "AI Dash Cams", Samsara, Inc., [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Samsara, "CM31 Dash Camera Datasheet—Internet-Connected Front-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
Samsara, "CM32 Dash Camera—Internet-Connected Dual-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara, "Unpowered Asset Tracker AG45 Datasheet", accessed Feb. 21, 2024 [publication date unknown], in 4 pages. URL: https://www.samsara.com/pdf/docs/AG45_Datasheet.pdf.
Samsara, "Vehicle Gateways—VG34, VG54, VG54H Datasheet", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 8 pages.
Driver I, The Power of Vision, Netradyne, [publication date unknown], in 2 pages.
"Driver Speed Management for Fleets—Monitoring Speeding in your fleet to increase safety and lower costs", Lytx, 2018, in 9 pages. URL: https://web.archive.org/web/20181217230050/https://www.lytx.com/en-us/fleet-services/program-enhancements/speed-management-for-fleets.
"Eco:Drive™ Social, the community of responsible drivers", Stellantis, Apr. 15, 2014, in 2 pages. URL: https://www.media.stellantis.com/em-en/fiat/press/eco-drive-social-the-community-of-responsible-drivers.
"EcoDrive", Wikipedia, 2022, in 1 page. URL: https://en.wikipedia.org/wiki/EcoDrive.
"Fiat 500—2015 Owner's Manual", FCA US LLC, 2016, 5th ed., in 440 pages.
"Fiat 500 Eco system", Fiat 500 Eco System Forum, Apr. 21, 2020, in 5 pages. URL: https://www.fiat500usaforum.com/forum/fiat-500-forums/fiat-500-general-discussion/32268-fiat-500-eco-system?36406-Fiat-500-Eco-system=.
"Fiat launches EcoDrive for 500 and Grande Punto", Indian Autos Blog, Jul. 10, 2008, in 4 pages. URL: https://indianautosblog.com/fiat-launches-ecodrive-for-500-and-grande-punto-p3049.
"Fiat launches fleet-specific eco:Drive system", Fleet World, 2010, in 3 pages. URL: https://fleetworld.co.uk/fiat-launches-fleet-specific-ecodrive-system/.
Goodwin, A., "Fiats ecoDrive teaches efficient driving", CNET, Oct. 22, 2008, in 5 pages. URL: https://www.cnet.com/roadshow/news/fiats-ecodrive-teaches-efficient-driving/.
"Introduction Pack", Drivecam, Inc., 2012, in 32 pages. URL: https://www.iae-services.com.au/downloads/DriveCam-Introduction-Pack.pdf.
"Lytx DriveCam Program Adds New Client-Centric Enhancements", Mass Transit, Oct. 4, 2016, in 6 pages. URL: https://www.masstransitmag.com/safety-security/press-release/12265105/lytx-lytx-drivecamtm-program-adds-newclient-centric-enhancements-evolving-the-gold-standard-video-telematics-program.
"Lytx Video Services Workspace—Screenshot Key", Lytx, 2017, in 1 page. URL: https://www.multivu.com/players/English/7899252-lytx-video-services-program/docs/KeytoLytx_1505780254680-149005849.pdf.
"Making roads safer for everyone, everywhere", Light Metrics, 2023, in 8 pages. URL: https://www.lightmetrics.co/about-us.
"Nauto—Getting Started", Manualslib, Nauto, Inc., Apr. 20, 2017, in 18 pages. URL: https://www.manualslib.com/manual/1547723/Nauto-Nauto.html.
"Netradyne Adds New Detection Features to Driveri Platform", Automotive Fleet Magazine, Oct. 27, 2016, in 13 pages. URL: https://www.automotive-fleet.com/137445/netradyne-adds-new-detection-features-to-driveri-platform.
"NetraDyne Discuss their AI Platform 5G and their vision of the IoT (Internet of Things)", GSMA, Oct. 3, 2018, in 2 pages. URL: https://www.gsma.com/solutions-and-impact/technologies/internet-of-things/news/netradyne-interview/.
"Netradyne Vision based driver safety solution—Model Name: Driver I, Model No. DRI-128-TMO" [device specification], [publication date unknown], in 4 pages. URL: https://device.report/m/4dd89450078fa688b333692844d3bde954ddfbaf5c105c9d1d42dfd6965cbf1b.pdf.
"NetraDyne, an Artificial Intelligence Leader, Launches Driver-i™, a Vision-Based Platform, Focusing on Commercial Vehicle Driver Safety", Netradyne, [publication date unknown], in 2 pages.
"NetraDyne's Artificial Intelligence Platform Improves Road Safety", Sierra Wireless, Oct. 31, 2016, in 4 pages. URL: https://device.report/m/7d898f1b967fc646a1242d092207719be5da8c6cc9c7daabc63d4a307cfd3dcb.pdf.
"Sensor Fusion: Building the Bigger Picture of Risk", Lytx, Apr. 12, 2019, in 1 page. URL: https://www.lytx.com/newsletter/sensor-fusion-building-the-bigger-picture-of-risk.
"The 2012 Fiat 500: eco:Drive", Fiat500USA.com, Feb. 14, 2011, in 24 pages. URL: http://www.fiat500usa.com/2011/02/2012-fiat-500-ecodrive.html.
"The World's Smartest 360° Dashcam: Vezo 360—Fast Facts", Arvizon, [publication date unknown], in 7 pages. URL: https://cdn.newswire.com/files/x/5e/13/b92cd7c6259a708e1dfdaa0123c4.pdf.
"What is a ter-a-flop?", netradyne.com, [publication date unknown], in 2 pages.
"Vezo 360 Dash Cam—Capture Every Single Angle in Crisp Detail", ArVizon, 2019, in 13 pages. URL: https://www.arvizon.com/vezo-360-dash-cam/.
"Vezo 360, the World's Smartest Dashcam, Keeps You Awake at the Wheel", PR Newswire, Apr. 2, 2019, in 4 pages. URL: https://www.prnewswire.com/news-releases/vezo-360-the-worlds-smartest-dashcam-keeps-you-awake-at-the-wheel-300823457.html.
Alpert, B., "Deep Learning for Distracted Driving Detection", Nauto, Jan. 15, 2019, in 10 pages. URL: https://www.nauto.com/blog/nauto-engineering-deep-learning-for-distracted-driver-monitoring.
Amazon Web Services, "How Nauto is Using AI & MI to Build a Data Platform That Makes Driving Safer and Fleets Smarter" [video], YouTube, Apr. 16, 2018, screenshot in 1 page. URL: https://www.youtube.com/watch?v=UtMIrYTmCMU.
Armstrong, C. et al. "Transport Canada Commercial Bus HVEDR Feasibility Study (File No. T8080-160062) Deliverable No. 4", Mecanica Scientific Services Corp, 2018, in 62 pages. URL: https://transcanadahvedr.ca/wp-content/uploads/2022/01/T8080_Deliverable4-DevSmryRpt-FINAL-20180804_English.pdf.
Automototv, "Fiat ecoDrive System" [video], YouTube, Oct. 6, 2008, screenshot in 1 page URL: https://www.youtube.com/watch?v=AUSb2dBBI8E.
Batchelor, B. et al., "Vision Systems on the Internet", Proc. SPIE 6000, Two- and Three-Dimensional Methods for Inspection and Metrology III, Nov. 2005, vol. 600003, in 15 pages.
Bendix Commercial Vehicle Systems LLC, "Bendix launches new Wingman Fusion safety system at Mid-America Trucking Show", OEM Off-Highway, Mar. 25, 2015, in 10 pages. URL: https://www.oemoffhighway.com/electronics/sensors/proximity-detection-safety-

(56) References Cited

OTHER PUBLICATIONS systems/press-release/12058015/bendix-launches-new-wingman-fusion-safety-system-at-midamerica-trucking-show.
Bendix, "Bendix® Wingman® Fusion: The Integration of camera, radar, and brakes delivers a new level of performance in North America", Waterstruck.com, 2015, in 10 pages. URL: https://www.waterstruck.com/assets/Bendix-Wingman-Fusion-brochure_Truck-1.pdf.
Bendix, "Quick Reference Catalog", Bendix Commercial Vehicle Systems LLC, 2018, in 165 pages. URL: https://www.bendix.com/media/home/bw1114_us_010.pdf (uploaded in 2 parts).
Bergasa, L. M. et al., "DriveSafe: an App for Alerting Inattentive Drivers and Scoring Driving Behaviors", IEEE Intelligent Vehicles Symposium (IV), Jun. 2014, in 7 pages.
Boodlal, L. et al., "Study of the Impact of a Telematics System on Safe and Fuel-efficient Driving in Trucks", U.S. Department of Transportation, Federal Motor Carrier Safety Administration, Apr. 2014, Report No. FMCSA-13-020, in 54 pages.
Camillo, J., "Machine Vision for Medical Device Assembly", Assembly, Mar. 3, 2015, in 5 pages. URL: https://www.assemblymag.com/articles/92730-machine-vision-for-medical-device-assembly.
Camillo, J., "Machine Vision for Medical Device Assembly", Assembly, Mar. 3, 2015, in 5 pages.
Cetecom, "FCC/IC Test Setup Photos, Intelligent Driving MonitoringCam", Cetecom, Inc., Feb. 7, 2018, in 9 pages. URL: https://device.report/m/a68e1abef29f58b699489f50a4d27b81f1726ab4f55b3ac98b573a286594dc54.pdf.
Chauhan, V. et al., "A Comparative Study of Machine Vision Based Methods for Fault Detection in an Automated Assembly Machine", Procedia Manufacturing, 2015, vol. 1, pp. 416-428.
Chiou, R. et al., "Manufacturing E-Quality Through Integrated Web-enabled Computer Vision and Robotics", The International Journal of Advanced Manufacturing Technology, Aug. 2009, vol. 43, in 19 pages.
Chiou, R. et al., "Manufacturing E-Quality Through Integrated Web-enabled Computer Vision and Robotics", The International Journal of Advanced Manufacturing Technology, 2009 (published online Oct. 1, 2008), vol. 43, in 11 pages.
Cook, B., "Drivecam: Taking Risk out of Driving, Findings related to In-Cab driver Distraction", Drivecam, 2010, in 50 pages. URL: https://www.fmcsa.dot.gov/sites/fmcsa.dot.gov/files/docs/MCSAC_201006_DriveCam.pdf.
Cordes, C., "Ask an Expert: Capturing Fleet Impact from Telematics", McKinsey & Co., Jun. 13, 2017, in 3 pages. URL: https://www.mckinsey.com/capabilities/operations/our-insights/ask-an-expert-capturing-fleet-impact-from-telematics.
D'Agostino, C. et al., "Learning-Based Driving Events Recognition and Its Application to Digital Roads", IEEE Transactions on Intelligent Transportation Systems, Aug. 2015, vol. 16(4), pp. 2155-2166.
Dillon, A., "User Interface Design", MacMillan Encyclopedia of Cognitive Science, 2003, vol. 4, London: MacMillan, in 18 pages (pp. 453-458). Downloaded from http://hdl.handle.net/10150/105299.
Dunn, B., "What is the Lytx DriveCam?", Autobytel, Jul. 12, 2014, in 1 page. URL: https://www.autobytel.com/what-is-lytx-drivecam.
Ekström, L., "Estimating fuel consumption using regression and machine learning", KTH Royal Institute of Technology, Degree Project in Mathematics, 2018, in 126 pages.
Engelbrecht, J. et al., "A Survey of Smartphone-based Sensing in Vehicles for ITS Applications", IET Intelligent Transport Systems, Jul. 2015, vol. 9(10), in 23 pages.
Fiat, "Interview to Giorgio Neri: videotutorial eco:Drive" [video], YouTube, Dec. 1, 2010, screenshot in 1 page. URL: https://www.youtube.com/watch?v=XRDeHbUimOs&t=27s.
Fiatfranco, "Ciao!"—Fiat ecoDrive [video], YouTube, Sep. 10, 2007, screenshot in 1 page URL: https://www.youtube.com/watch?v=SluE9Zco55c.

Firstnet™ Built with AT&T, "Reliable telematics solution for utility fleets", Fleet Complete, Apr. 25, 2019, in 2 pages. URL: https://www.firstnet.com/content/dam/firstnet/white-papers/firstnet-fleet-complete-utilities.pdf.
Fleet Complete, "Tony Lourakis tests out Fleet Complete Vision—our new video telematics and driver coaching tool" [video], YouTube, Jan. 9, 2019, screenshot in 1 page. URL: https://www.youtube.com/watch?v=3zEY5x5DOY8.
Fleet Equipment Staff, "Lytx announces enhancements to DriveCam system", Fleetequipmentmag.com, Oct. 7, 2016, in 9 pages. URL: https://www.fleetequipmentmag.com/lytx-drivecam-system-truck-telematics/.
Gilman, E. et al., "Personalised assistance for fuel-efficient driving", Transportation Research Part C, Mar. 2015, pp. 681-705.
Ginevra2008, "Fiat EcoDrive" [video], YouTube, Mar. 7, 2008, screenshot in 1 page. URL: https://www.youtube.com/watch?v=D95p9Bljr90.
Goncalves, J. et al., "Smartphone Sensor Platform to Study Traffic Conditions and Assess Driving Performance", 17th International IEEE Conference on Intelligent Transportation Systems (ITSC), Oct. 2014, in 6 pages.
Groover, M. P., "Chapter 22 Inspection Technologies", in Automation, Production Systems, and Computer-Integrated Manufacturing, 2015, 4th Edition, Pearson, pp. 647-684.
Groover, M. P., *Automation, Production Systems, and Computer-Integrated Manufacturing*, 2016, 4th Edition (Indian Subcontinent Adaptation), Pearson, in 11 pages.
Hampstead, J. P. "Lightmetrics:an exciting video telematics software startup", FrieghtWaves, Aug. 5, 2018, in 4 pages. URL: https://www.freightwaves.com/news/lightmetrics-exciting-video-telematics-startup.
Han, Z. et al., "Design of Intelligent Road Recognition and Warning System for Vehicles Based on Binocular Vision", IEEE Access, Oct. 2018, vol. 6, pp. 62880-62889.
Haworth, N. et al., "The Relationship between Fuel Economy and Safety Outcomes", Monash University, Accident Research Centre, Dec. 2001, Report No. 188, in 67 pages.
Horsey, J., "VEZO 360 4K 360 dash cam from $149", Geeky Gadgets, Apr. 3, 2019, in 12 pages. URL: https://www.geeky-gadgets.com/vezo-360-4k-360-dash-cam-03-04-2019/.
Huang, K.-Y. et al., "A Novel Machine Vision System for the Inspection of Micro-Spray Nozzle", Sensors, Jun. 2015, vol. 15(7), pp. 15326-15338.
Huff, A., "Lytx DriveCam", CCJDigital, Apr. 4, 2014, in 12 pages. URL: https://www.ccjdigital.com/business/article/14929274/lytx-drivecam.
Huff, A., "NetraDyne Uses Artificial Intelligence in New Driver Safety Platform", CCJ, Sep. 15, 2016, in 10 pages. URL: https://www.ccjdigital.com/business/article/14933761/netradyne-uses-artificial-intelligence-in-new-driver-safety-platform.
Junior, J. F. et al., "Driver behavior profiling: An investigation with different smartphone sensors and machine learning", PLoS One, Apr. 2017, vol. 12(4): e0174959, in 16 pages.
Kwon, Y. J. et al., "Automated Vision Inspection in Network-Based Production Environment", International Journal of Advanced Manufacturing Technology, Feb. 2009, vol. 45, pp. 81-90.
Lan, M. et al., "SmartLDWS: A Robust and Scalable Lane Departure Warning System for the Smartphones", Proceedings of the 12th International IEEE Conference on Intelligent Transportation Systems, Oct. 3-7, 2009, pp. 108-113.
Lekach, S., "Driver safety is 'all talk' with this AI real-time road coach", Mashable, Aug. 3, 2018, in 11 pages. URL: https://mashable.com/article/netradyne-driveri-ai-driver-safety.
Lotan, T. et al., "In-Vehicle Data Recorder for Evaluation of Driving Behavior and Safety", Transportation Research Record Journal of the Transportation Research Board, Jan. 2006, in 15 pages.
Lytx, "TeenSafe Driver Program", American Family Insurance®, 2014, in 10 pages. URL: https://online-sd02.drivecam.com/Downloads/TSD_WebsiteGuide.pdf.
Malamas, Elias N. et al. "A survey on industrial vision systems, applications and tools", Image and Vision Computing, Dec. 28, 2002, vol. 21, pp. 171-188.

(56) References Cited

OTHER PUBLICATIONS

Meiring, G. et al., "A Review of Intelligent Driving Style Analysis Systems and Related Artificial Intelligence Algorithms", Sensors, Dec. 2015, vol. 15, pp. 30653-30682.
Mitrovic, D. et al., "Reliable Method for Driving Events Recognition", IEEE Transactions on Intelligent Transportation Systems, Jun. 2005, vol. 6(2), pp. 198-205.
Multivu.com, "Powerful Technology ER-SV2 Event Recorder", Lytx Inc., 2015, in 2 pages. URL: https://www.multivu.com/players/English/7277351-lytx-activevision-distracted-driving/document/52a97b52-6f94-4b11-b83b-8c7d9cef9026.pdf.
Nauto, "How Fleet Managers and Safety Leaders Use Nauto" [video], YouTube, Jan. 25, 2018, screenshot in 1 page. URL: https://www.youtube.com/watch?v=k_iX7a6j2-E.
Nauto, "The New World of Fleet Safety—Event Keynote" [video], YouTube, Jul. 9, 2020, screenshot in 1 page. URL: https://www.youtube.com/watch?v=iMOab9Ow_CY.
Netradyne Inc., "Netradyne Introduces New DriverStar Feature to Recognize and Reward Safe Driving", PR Newswire, Netradyne, Inc., Oct. 19, 2017, in 2 pages. URL: https://www.prnewswire.com/news-releases/netradyne-introduces-new-driverstar-feature-to-recognize-and-reward-safe-driving-300540267.html.
Netradyne India, "Netradyne Driveri Covered in BBC Click" [video], YouTube, Jan. 25, 2018, screenshot in 1 page. URL: https://www.youtube.com/watch?v=jhULDLj9iek.
Netradyne presentation, Netradyne, Oct. 2016, in 23 pages.
Netradyne, "Driver•i™ Catches No. Stop ad Stop Sign | Fleet Management Technology" [video], YouTube, Oct. 3, 2017, screenshot in 1 page. URL: https://www.youtube.com/watch?v=18sX3X02aJo.
Netradyne, "Driver•i™ Flags Commercial Driver Running Red Light—360-degree vi" [video], YouTube, Oct. 3, 2017, screenshot in 1 page. URL: https://www.youtube.com/watch?v=au9_ZNGYCmY.
Netradyne, Driver Card 1, 2018, in 2 pages.
Netradyne, Driver Card 2, 2018, in 2 pages.
Ohidan, A., "Fiat and AKQA Launch Eco-Drive™", Science 2.0, Oct. 7, 2008, in 4 pages. URL: https://www.science20.com/newswire/fiat_and_akqa_launch_eco_drive_tm.
Perez, L. et al., "Robot Guidance Using Machine Vision Techniques in Industrial Environments: A Comparative Review", Sensors, Mar. 2016, vol. 16(3), in 27 pages.
Puckett, T. et al. "Safety Track 4B-Driver Risk Management Program", Airports Council International, Jan. 18, 2019, in 29 pages. URL: https://airportscouncil.org/wp-content/uploads/2019/01/4b-DRIVER-RISK-MANAGEMENT-PROGRAM-Tamika-Puckett-Rob-Donahue.pdf.
Ramkumar, S. M. et al., "Chapter 14 Web Based Automated Inspection and Quality Management", in Web-Based Control and Robotics Education, 2009, ed., Spyros G. Tzafestas, Springer, in 42 pages.
Tzafestas, S. G. (ed.), *Web-Based Control and Robotics Education*, 2009, Springer, ISBN 978-90-481-2504-3, in 362 pages. [uploaded in 3 parts].
Sindhu MV, "How this three-year-old Bengaluru startup is helping make US roads safer with its video analytics solutions", Yourstory.com, Mar. 26, 2018, in 7 pages. URL: https://yourstory.com/2018/03/lightmetrics-road-safety-analytics.
Smart Dash Cam Vezo360!, "Vivek Soni Co-Founder at Arvizon" [video], YouTube, Feb. 21, 2019, screenshot in 1 page. URL: https://www.youtube.com/watch?v=leclwRCb5ZA.
Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, in 12 pages.
Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, pp. 4579-4591, in 13 pages.
Soumik Ukil, "LightMetrics ADAS demo" [video], YouTube, Jul. 20, 2017, screenshot in 1 page. URL: https://www.youtube.com/watch?app=desktop&v=9LGz1oo7dTw.
Steger, C. et al., "Chapter 2 Image Acquisition" and "Chapter 3 Machine Vision Algorithms", in Machine Vision Algorithms and Applications, 2018, 2nd ed., Wiley, in 604 pages.
Steger, C. et al., *Machine Vision Algorithms and Applications*, 2018, 2nd ed., Wiley, in 60 pages.
Straight, B. "Over 20 years later, Lytx continues to evolve alongside the industry it serves", FreightWaves, Apr. 16, 2019, in 4 pages. URL: https://www.freightwaves.com/news/technology/the-evolution-of-lytx.
Straight, B., "Netradyne using AI to provide intelligent insight into distracted driving", Netradyne, Inc., Nov. 8, 2017, in 4 pages. URL: https://www.freightwaves.com/news/2017/11/7/netradyne-using-ai-to-provide-intelligent-insight-into-distracted-driving.
Su, C.-C. et al., "Bayesian depth estimation from monocular natural images", Journal of Vision, 2017, vol. 17(5):22, pp. 1-29.
Sung, T.-W. et al., "A Speed Control Scheme of Eco-Driving at Road Intersections", 2015 Third International Conference on Robot, Vision and Signal Processing, 2015, pp. 51-54.
Suppose U Drive, "New Trucking Tech: Forward Facing Cameras" supposeudrive.com, Mar. 15, 2019, in pp. 7. URL: https://supposeudrive.com/new-trucking-tech-forward-facing-cameras/.
The Wayback Machine, "AT&T Fleet Complete—Give your Business a competitive advantage ", AT&T, 2019, in 12 pages. URL: https://web.archive.org/web/20190406125249/http:/att.fleetcomplete.com/.
The Wayback Machine, "Introducing Driver-I™", NetraDyne, Sep. 22, 2016, in 4 pages URL: https://web.archive.org/web/20160922034006/http://www.netradyne.com/solutions.html.
The Wayback Machine, "NetraDyne's Driver-I™ platform delivers results beyond legacy safety video systems Counting safe driving as safe drivin—taking second-guessing out of commercial fleet driver safety", NetraDyne, Feb. 9, 2018, in 7 pages. URL: https://web.archive.org/web/20180209192736/http:/netradyne.com/solutions/.
Top Fives, "15 BIGGEST Data Centers on Earth" [video], YouTube, Jun. 9, 2024, screenshot in 1 page. URL: https://www.youtube.com/watch?v=1LmFmCVTppo.
Uliyar, M., "LightMetrics' RideView video safety system provides the best ROI", Linkedin, Sep. 8, 2016, in 4 pages URL: https://www.linkedin.com/pulse/lightmetrics-rideview-video-safety-system-provides-best-mithun-uliyar/.
Vezo 360, "World's Smartest Dash Cam Powered by AI" [video], YouTube, Mar. 31, 2019, screenshot in 1 page. URL: https://www.youtube.com/watch?v=M5r5wZozS0E.
Vlahogianni, E. et al., "Driving analytics using smartphones: Algorithms, comparisons and challenges", Transportation Research Part C, Jun. 2017, vol. 79, pp. 196-206.
Wahlstrom, J. et al., "Smartphone-based Vehicle Telematics—A Ten-Year Anniversary", IEEE Transactions on Intelligent Transportation Systems, Nov. 2016, vol. 18(10), in 23 pages.
Wu, S., "Motivating High-Performing Fleets with Driver Gamification", Samsara, Feb. 2, 2018, in 4 pages. URL: https://www.samsara.com/blog/motivating-high-performing-fleets-with-driver-gamification/.
Yufeng, Z. et al., "3G-Based Specialty Vehicles Real-Time Monitoring System", Applied Mechanics and Materials, Feb. 2014, vols. 513-517, pp. 871-875.
Yufeng, Z. et al., "3G-Based Specialty Vehicles Real-Time Monitoring System", Applied Mechanics and Materials, Feb. 2014, vols. 513-517, pp. 871-875, in 7 pages.
Zanini, M. et al., "Mobile Assets Monitoring for Fleet Maintenance", SAE International, Apr. 11-14, 2005, in 9 pages.
Zanini, M. et al., "Mobile Assets Monitoring for Fleet Maintenance", SAE International, 2005, pp. 369-375, in 8 pages.
Zhong, R. Y. et al., "Intelligent Manufacturing in the Context of Industry 4.0: A Review", Engineering, Oct. 2017, vol. 3, Issue 5, pp. 616-630.

\* cited by examiner

SYSTEMS AND METHODS FOR DASHCAM INSTALLATION

TECHNICAL FIELD

Embodiments of the present disclosure relate to devices, systems, and/or methods that analyze image data to generate and provide instructions to a user to configure a dashcam or camera system.

BACKGROUND

Camera installations within vehicles have increased in popularity and can monitor a vehicle's surrounding environment, such as other cars or roads. For example, the camera can also be utilized to monitor the interior of a vehicle as well. The accuracy of any detection is correlated with the placement, position, and/or orientation of the camera. Additionally, companies that operate multiple vehicles may like to monitor drivers.

SUMMARY

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

To monitor or record the driver's behavior, a dashcam or camera system can be positioned to be in an acceptable placement or position for analysis (e.g., by a machine learning or artificial intelligence algorithm). In some embodiments, an acceptable position of a dashcam can be defined as a range of physical placements/locations in a vehicle and/or in combination with an orientation/direction that a dashcam is facing or is otherwise positioned to face (e.g., by rotating the dashcam once secured to the vehicle), so that the dashcam can visually capture an image of one or more objects that the camera is configured to monitor and/or analyze. For example, the dashcam can be configured to monitor a driver behavior by detecting features or factors that indicate a likelihood that the driver is driving distracted (e.g., on the phone, not looking at the road, or the like). Such feature or factors may include one or more of: a driver's head pose or movements, hand position and movements, and/or other body movements. In one example, an acceptable dashcam position can be a position where the camera can capture the driver's head pose, hands, and body at an angle that can show a sufficient range of motion of the driver and/or camera move during operation of the vehicle.

Installing a dashcam or camera in the acceptable placement, position, and/or orientation can be time consuming and unfriendly for an installer without additional guidance, for example. For example, previously an installing process for the dashcam might include: capturing images from a corresponding camera, adjusting the dashcam based on the captured images, capturing new images from the corresponding camera based on the adjustments, and guessing that the dashcam is in an acceptable position but without knowing whether any software or person would be able to review future images clearly or effectively. The installation process can be repeated until the dashcam is verified to be installed in the acceptable position and/or orientation, which can take many steps and might require feedback from a third party (e.g., a reviewer of the images) which might occur over days or weeks. Further, in some embodiments, manually verifying the camera position by viewing the captured images can be time-consuming and laborious, rendering impractical any real-time or near real-time analysis of such captured images from the camera. Additionally, the manual verification by the installer can cause an inaccuracy. For example, even though the installer can verify that the driver appears in captured images, such images may not clearly show important features of the driver (e.g., hands, steering wheel, torso, etc.) due to the dashcam's position or orientation. Furthermore, if the dashcam position or orientation is changed during operating the vehicle (e.g., if the car goes over a bump and the dashcam falls or rotates), the driver may not know the changed dashcam position, and the dashcam cannot monitor or record the object(s) that the dashcam is configured to monitor or record. These limitations can make it particularly difficult to deal with situation of productivity or efficiency without a dynamic and interactive system/method of configuring a camera (e.g., once that uses machine learning and/or artificial intelligence to provide an off-line and real-time assessment with guided instructions).

A dashcam or one or more cameras installed within a vehicle can monitor and/or record its surrounding object(s) or object(s) inside the vehicle. For example, the dashcam can monitor or record a driver. However, it is inefficient to install the dashcam in an acceptable position by manually verifying the dashcam position and finding the acceptable dashcam position by solely viewing the captured images. Therefore, there is a need for dynamic and interactive systems and methods that can provide a dashcam installation position and orientation instruction in real-time or near in real-time by analyzing captured images from the dashcam as compared to a trained machine learning or artificial intelligence model. Although reference is made to camera(s), in this application, the camera(s) might be generally included in a dashcam.

The present disclosure includes various implementations and improvements to systems and methods for dashcam installation. According to various embodiments, the systems and methods of the present disclosure may enable efficient dashcam installation and positioning using a user device connected, directly or indirectly, to the dashcam. The user device (e.g., a cell phone, laptop, tablet, smart watch, or the like) can be connected with the dashcam to exchange data to enable an efficient dashcam installation and positioning. In some embodiments, the user device may receive captured images from the dashcam, and the received images can then be displayed on a display corresponding to the user device. The user device may provide dashcam position and orientation calibration functionality. For example, one or more interactive reference guidelines or frames can be displayed as an overlayed image on the display that may also display one or more captured images from the dashcam. The interactive reference guidelines or frames can be dynamically adjusted based on particularities of the dashcam configured to monitor or record one or more objects. For example, the interactive reference guidelines or frames may indicate how and where to move and orient the dashcam (e.g., by approximately how many inches in a specific direction, by approximately how many degrees to rotate, or the like).

The systems and methods can also include generating dashcam installation instructions and/or inferences based on analyzing captured images from the dashcam. For example, the dashcam may analyze at least one portion of a captured image to determine whether the dashcam is installed in an acceptable position. To analyze the captured image, the dashcam may utilize a various types of image processing techniques, such as by identifying a region of interest from the captured image associated with a driver's face, body, or other features. The analysis also can utilize a machine learning model to detect the region of interest and analyze the detected region of interest. For example, if the dashcam is configured to monitor the driver's driving behavior by detecting features that indicate a likelihood of distracted driving, the machine learning model may detect the driver's eyes as a region of interest and analyze whether the dashcam can capture clear images of the driver's eyes as they move away from the road.

Additionally, determination of whether the dashcam is in an acceptable position and/or orientation may be based at least in part on a machine learning model or artificial intelligence model being applied to any captured images to identify events or driver behavior/features. For example, if the model is trained based on images that view drivers within a certain range, any inputs should be within the same range so that any outputs would have improved confidence values. For instance, if the model was trained with more data with a broader range of views of drivers, then what makes the dashcam placement acceptable can be adjusted based on the improved training of the associated model so that a wider range of angles or additional positions can be used to identify behavior or features with a higher level of confidence. In some embodiments, acceptability can be determined based on a threshold confidence of example outputs corresponding to the trained model being used to identify behavior and/or features of the driver of the vehicle installing or otherwise using the dashcam.

Accordingly, in various embodiments, large amounts of data may be automatically and dynamically gathered and analyzed in response to user inputs and configurations, and the analyzed data may be efficiently presented to users. Thus, in some embodiments, the systems, devices, configuration capabilities, graphical user interfaces, and the like described herein are more efficient as compared to previous systems, etc.

Further, as described herein, according to various embodiments systems and/or devices may be configured and/or designed to generate graphical user interface data useable for rendering the various interactive graphical user interfaces described. The graphical user interface data may be used by various devices, systems, and/or software programs (for example, a browser program), to render the interactive graphical user interfaces. The interactive graphical user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic graphical user interfaces that are the result of significant development. This non-trivial development has resulted in the graphical user interfaces described herein which may provide significant cognitive and ergonomic efficiencies and advantages over previous systems. The interactive and dynamic graphical user interfaces include improved human-computer interactions that may provide reduced mental workloads, improved decision-making, improved capabilities, reduced work stress, and/or the like, for a user. For example, user interaction with the interactive graphical user interface via the inputs described herein may provide an optimized display of, and interaction with, video gateway devices or controller devices, and may enable a user to more quickly and accurately access, navigate, assess, and digest analyses, configurations, received/operational data, and/or the like, than previous systems.

Further, the interactive and dynamic graphical user interfaces described herein are enabled by innovations in efficient interactions between the user interfaces and underlying systems and components. For example, disclosed herein are improved methods of receiving user inputs (including methods of interacting with, and selecting, received data), translation and delivery of those inputs to various system components (e.g., a dashcam or camera system, a vehicle gateway, etc.), automatic and dynamic execution of complex processes in response to the input delivery (e.g., image analysis to identify regions of interest, generation of installation instructions with respect to a camera system or dashcam), automatic interaction among various components and processes of the system, and automatic and dynamic updating of the user interfaces (to, for example, display the information related to a dashcam system). The interactions and presentation of data via the interactive graphical user interfaces described herein may accordingly provide cognitive and ergonomic efficiencies and advantages over previous systems.

Various embodiments of the present disclosure provide improvements to various technologies and technological fields, and practical applications of various technological features and advancements. For example, as described above, some existing systems are limited in various ways, and various embodiments of the present disclosure provide significant improvements over such systems, and practical applications of such improvements. Additionally, various embodiments of the present disclosure are inextricably tied to, and provide practical applications of, computer technology. In particular, various embodiments rely on detection of user inputs via graphical user interfaces, operation and configuration of controller devices, calculation of updates to displayed electronic data based on user inputs, automatic processing of received data, and presentation of updates to displayed data and analyses via interactive graphical user interfaces. Such features and others are intimately tied to, and enabled by, computer technology, image processing technology, and electronic controller technology, and would not exist except for computer technology, image processing technology, and electronic controller technology. For example, the dashcam functionality and interactions with the user device and/or backend server described below in reference to various embodiments cannot reasonably be performed by humans alone, without the computer and imaging technology upon which they are implemented. Further, the implementation of the various embodiments of the present disclosure via computer technology enables many of the advantages described herein, including more efficient interaction with, and presentation and analysis of, various types of electronic data, controller device operation and configuration, and the like.

Various embodiments of the present disclosure provide improvements to various technologies and technological fields, and practical applications of various technological features and advancements. For example, as described above, some existing systems are limited in various ways, and various embodiments of the present disclosure provide significant improvements over such systems, and practical applications of such improvements. Additionally, various embodiments of the present disclosure are inextricably tied to, and provide practical applications of, computer technology. In particular, various embodiments rely on detection of user inputs via graphical user interfaces, operation and configuration and manipulation of devices (e.g., dashcam or camera systems), calculation of updates to displayed electronic data based on user inputs or adjustments to one or more devices, automatic processing of received data, and presentation of updates to displayed data and analyses via interactive graphical user interfaces.

Various combinations of the above and below recited features, embodiments, and aspects are also disclosed and contemplated by the present disclosure.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1:
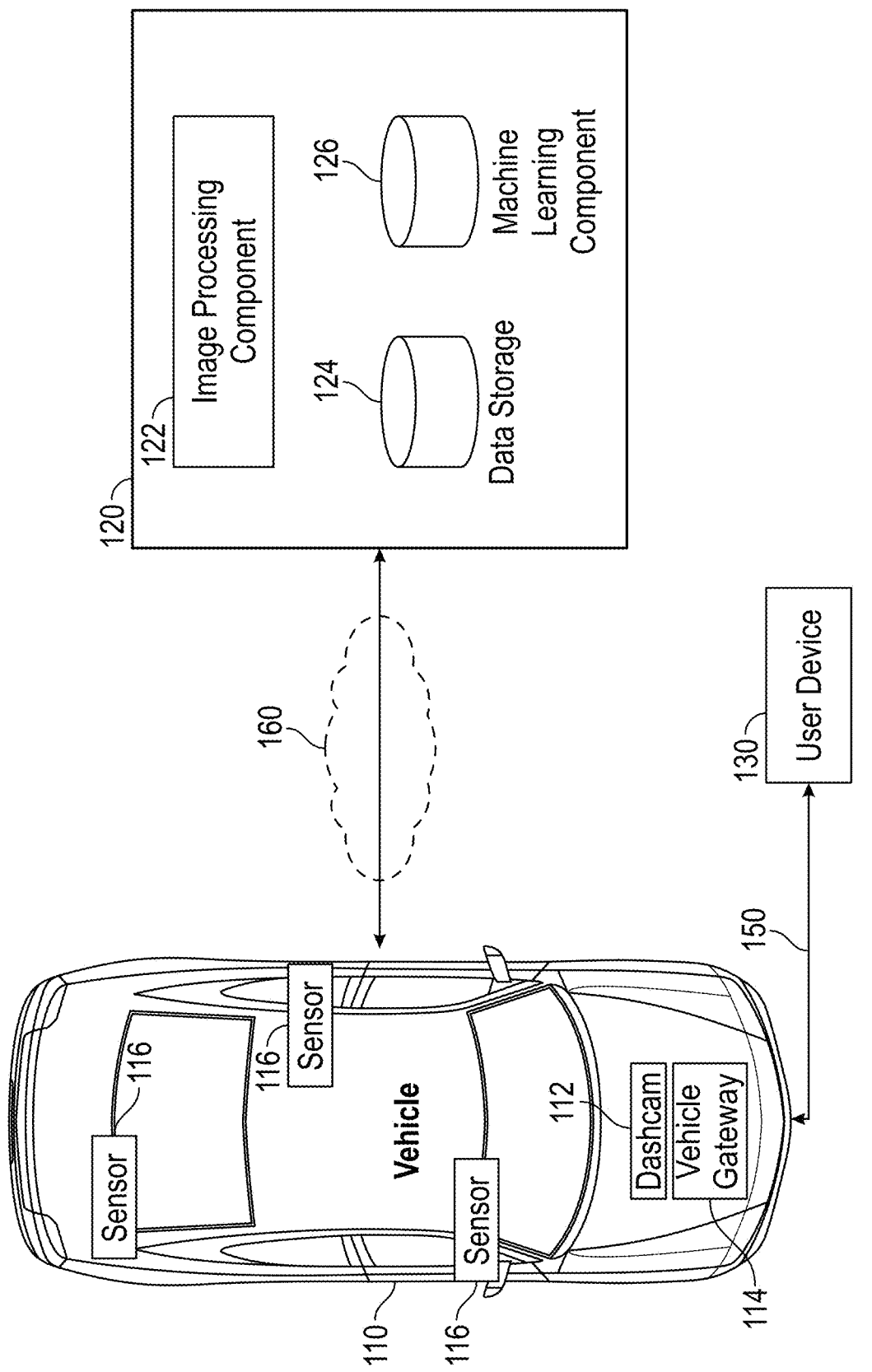
FIG. 1 illustrates a block diagram of an example operating environment in which one or more aspects of the present disclosure may operate, according to various embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

As mentioned above, according to various embodiments, the present disclosure includes one or more cameras can be configured to monitor one or more objects inside or the both of the inside and outside of the vehicle. The camera(s) can be generally implemented in a dashcam. In some embodiments, a dashcam can refer to one or more cameras and/or sensors installed or secured within a vehicle. In some embodiments, the one or more cameras and/or sensors can be installed in a single housing or within multiple housings in or around a vehicle. The dashcam, for example, can be utilized to monitor a driver and/or the surrounding environments of the vehicle. In some embodiments, the dashcam can monitor the driver's behavior while driving. In some embodiments, the dashcam can detect a driver's behaviors (e.g., behaviors that may be indicative of an accident or crash or increased risk of an accident or crash). Such behaviors, for example, can include distracted driving behavior due to mobile phone usage, drowsy driving, or the like. To increase the effectiveness of identification of distracted driving behavior, the dashcam should be installed in a range of positions to provide an accurate image. For example, the face of the driver should be viewable in such a way so that it can be monitored to determine whether the driver is distracted due to a drowsy driving, so the dashcam should be installed to view or record specific features of the driver that are then modeled based on data collected from other drivers and correlated with accident data or similar. If the dashcam is installed in a position where it cannot adequately view the features of the driver, the driver's behavior, such as drowsy driving, cannot be identified. Thus, the dashcam should be installed in a position that is effective for viewing the driver's features. For example, an acceptable position would be based on the dashcam's ability to view the driver's features (e.g., face, hand position, eyes, or the like) as well as a machine learning or artificial intelligence model that was trained with driver data that utilized similar views. For example, if the model was trained using a specific range of views of a driver, any new inputs (e.g., data collected from any new drivers or driving) would provide improved output or behavior detection/identification if the new inputs are in a form or format similar to training data used by and for the model. For instance, as a model is trained using more data, the range of views that would be acceptable for a dashcam can be expanded to still maintain an effective confidence level in determining any outputs or outcomes.

Installing or securing the dashcam in an acceptable position can be challenging. Conventionally, a person (e.g., a driver or a user) installing a dashcam does not know whether the dashcam is installed or secured to a vehicle adequality and would perform a manual installation procedure. For example, during the manual installation procedure, the a person installing the dashcam would be unable to verify images or video streaming recorded from the dashcam because they are unaware of the status and quality of the model being used to identify features of the driver that plans to drive the vehicle. Also, the model would be updated over time, and at the person would be unable to understand how the model is applied and the criteria the system finds acceptable (e.g., within a range or threshold confidence level or value). Thus, the person installing the dashcam would verify the dashcam position after the installation and repeat the installation procedure by changing the dashcam position to find an position acceptable by the system. Furthermore, even though the dashcam is initially installed in an acceptable position, the dashcam position can be changed during driving due to external forces (or the underlying model(s) may be updated to be more stringent, such as by increasing confidence level threshold values corresponding to any identifications or outputs by the model(s)), and the person does not know whether the dashcam is still in the acceptable position until interacting with the system. For example, if the dashcam is tilted lower or higher than the initial or acceptable position or orientation while driving, the driver may not know about the changed dashcam position or orientation. Since the position or orientation changed, the person would initiate the installation procedure again to find a new acceptable position.

The present disclosure provides systems and methods for dashcam installation at an acceptable position. For example, the dashcam may include an inward-facing camera. In another example, the dashcam may include an inward-facing camera and an outward-facing camera. The inward-facing camera can be utilized to monitor a person inside a vehicle. For example, the inward-facing camera can be configured to monitor the driver to detect whether the driver is distracted from driving. The outward-facing camera can be configured to monitor the outward of the vehicle, such as the front view of the vehicle. For example, the outward-facing camera can determine whether the driver is distracted by identifying the driving path based on front view of the vehicle. The present disclosure does not limit number of cameras and/or sensors included in the dashcam. Additionally, the dashcam, as disclosed herein, can further include any number of different hardware components, such as one or more electrical components, circuitries, processing unit, memory, data storage, display unit, and/or various sensors. For example, while the specifications of dashcam may vary from one implementation to another, in one example embodiments, a vehicle device may include some or all of the components below:

One or more motion detection sensors.
Audio input and/or output device(s).
Image capturing and/or video recording circuitry.
Internal data storage.
Wireless data transfer circuitry.
Radio frequency front end components.
One or more antennas.
One or more microphones.
One or more speakers.
Data communication bus.
Dashcam mounting hardware and/or interface.
One or more accelerometers, such as accelerometers that measure acceleration (and/or related G forces) in each of multiple axes, such as in an X, Y, and Z-axis.
One or more gyroscope sensor, such as gyroscope sensor that maintain or provide orientation of the dashcam position.
One or more processors, such as a microcontroller.
One or more barometers.
A GPS signal receiver and/or transmitter.
A display unit. One or more computer processors, such as high-capacity processors that enable concurrent neural networks for real-time artificial intelligence.
One or more gyroscope sensor configured to provide an orientation of the dashcam with an accurate precision.
One or more light sensor configured to automatically adjust display lights based on the ambient light.
One or more barometer configured to measure the atmospheric pressure.
One or more user (or driver) identification sensor, such as a fingerprint sensor and iris scanner.
GPS receiver and/or transmitter.
One or more display screen.
One or more digital compass configured to provide an orientation information of the dashcam.
One or more infrared sensor.
One or more pressure sensor.
One or more temperature sensor.
Air humidity sensor.
Near Field Communication (NFC) sensor.
Laser configured to provide a focus of the camera installed in the dashcam.
Human gesture recognition sensor configured to recognize one or more person's gesture.

Additionally, the dashcam, as disclosed herein, can also include any number of different software components, such as one or more video codec, one or more audio codec, encryption software, an image calibration software, a data processing software, data format conversion software, dashcam video playback software, and/or an image analysis software. The types and number of hardware components and/or software components are not limited in the present disclosure so that any hardware components and/or software components that enhance capture or quality of any captured images may be utilized by the dashcam.

In some embodiments, the dashcam can be connected with a user device to communicate a data. In some embodiments, the dashcam can transmit data to the user device. In some embodiments, based on the received data, the user device can provide the dashcam position information to the installer (e.g., a driver or user). For example, the dashcam can transmit images or videos recorded from the dashcam. Thus, the installer may view the images or videos and calibrate the dashcam by changing the dashcam location or tilting the dashcam angle in real-time by calibrating the dashcam position.

In some embodiments, the dashcam can be configured to analyze an object to determine whether the dashcam is installed in the acceptable position (or correct position). For example, a dashcam having an inward camera can determine the acceptable dashcam position by analyzing one or more features of the driver, such as head pose, hand position, and position of the driver. Since every driver can have different physical characteristics such as height, weight, head pose, the dashcam may analyze the driver based on these characteristics. For example, the dashcam can identify a region of interest, such as the eyes and analyze the detected eyes to determine whether the current dashcam position can accurately detect the eyes. In some embodiments, the determination can be based on criteria or threshold, such that the dashcam is in an acceptable position when the analyzed results satisfy the criteria or threshold. For example, the criteria or threshold can be related to one or more parameters related to the clarity or visibility of the images, such as a number of pixels, resolution, noise, artifacts, blur factors, etc. In some embodiments, this analysis can be performed by utilizing a machine learning model. In some embodiments, the dashcam include the machine learning model as a software component, and the machine learning model can be updated by receiving one or more updated parameters from a backend server.

In some embodiments, the dashcam can also provide an evaluation of the current dashcam position. For example, the dashcam continuously monitors the current dashcam position by analyzing the region of interest of the driver. For example, if the driver is changed, the dashcam may determine whether the dashcam position needs to be changed based on the physical characteristic of the new driver. In addition, if the dashcam position is changed during the driving of the vehicle, the dashcam may notify the driver or an administrator that the dashcam position needs to be changed.

Embodiments presented herein use machine learning models in various implementations. Each machine learning model can include various machine learning algorithms. Systems presented herein can use a parameter function or a prediction model to predict or estimate dashcam acceptable position, a region of interest criteria, object detection, and/or dashcam position calibration, for example. In some embodiments, historical dashcam acceptable position or historical region of interest criteria corresponding to a driver is fed into a machine learning system. to generate a prediction model that predicts an acceptable dashcam position corresponding to the driver. For example, during a dashcam installation process, the prediction model can be applied to information about a driver who are previously installed the dashcam in the acceptable position.

To facilitate an understanding of the systems and methods discussed herein, several terms are described below. These terms and other terms used herein should be construed to include the provided descriptions, the ordinary and customary meanings of the terms, and/or any other implied meaning for the respective terms, wherein such construction is consistent with the context of the term. Thus, the descriptions below do not limit the meaning of these terms but only provide example descriptions.

A user input (also referred to as "input") can include any interaction, data, indication, etc., received by a system/device from a user, a representative of a user, an entity associated with a user, and/or any other entity. Inputs may include any interactions that are intended to be received and/or stored by the system/device; to cause the system/device to access and/or store data items; to cause the system to analyze, integrate, and/or otherwise use data items; to cause the system to update data that is displayed; to cause the system to update a way that data is displayed; to transmit or access data; and/or the like. Non-limiting examples of user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand or other appendage, a body, a 3D mouse, and/or the like.

A backend server (or "backend," "cloud," or "management server system") can include one or more network-accessible servers configured to communicate with vehicle devices (e.g., via a vehicle gateway and/or communication circuitry of a dashcam). A backend server is typically configured to communicate with multiple vehicle devices, such as each of a fleet of hundreds, thousands, or more vehicles. Thus, the management server may have context and perspective that individual vehicle devices do not have. For example, the management server may include data associated with a large quantity of vehicles, such as vehicles across a fleet or within a geographic area. Thus, the management server may perform analysis of asset data across multiple vehicles and between groups of vehicles (e.g., comparison of fleets operated by different entities). A backend server system may also include a feedback system that periodically updates event models used by vehicle devices to provide immediate in-vehicle alerts, such as when the backend server has optimized an event model based on analysis of asset data associated with many safety events, potentially across multiple fleets of vehicles.

A vehicle gateway can include a device positioned in or on a vehicle, which is configured to communicate with one or more sensors in the vehicle and to a backend server. In some embodiments, a vehicle gateway can be installed within a vehicle by coupling an interface of the vehicle gateway to the vehicle's on-board diagnostic (OBD) port, which may provide various sensor data (e.g., engine oil data, coolant temperature, milage, oxygen, knocking information from various sensors, etc.) to the vehicle gateway.

A user device can include a portable device configured to communicate with a vehicle device. A user device may include short-range communication circuitry, such as near field communication ("NFC"), WiFi Direct, Bluetooth ("BT"), Bluetooth Low Energy ("BLE"), etc., for communicating with the vehicle device. The user device can also include wireless communication circuitry, such as any commercially available wireless communication protocols, a high-speed 4G LTE, or other wireless communication technology, such as 5G communications.

Data storage can include any computer-readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

A database can include any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, extensible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments, such data may be combined and/or separated in any appropriate way into one or more databases, one or more tables of one or more databases, etc. As used herein, a data source may refer to a table in a relational database, for example.

II. Example Operating Environment

FIG. 1 illustrates a block diagram of an example operating environment 100 in which one or more aspects of the present disclosure may operate, according to various embodiments of the present disclosure. In some embodiments, the automated dashcam installation system includes the vehicle 110, backend server 120, and a user device 130. In these embodiments, the vehicle 110 communicates with the user device 130 via a network 150.

a. Dashcam 112

In some embodiments, the vehicle 110 includes a dashcam 112. In some embodiments, the dashcam includes one or more inward-facing camera or both of one or more inward-facing camera and one or more outward-facing camera. The dashcam 112 can further include one or more microprocessors and communication circuitry configured to transmit data to the user device 130 and backend server 120 via networks 150 and 160, respectively. In some embodiments, the dashcam 112 is physically coupled to (e.g., via wired or wireless communication channel) a vehicle gateway 114. In these embodiments, the vehicle gateway 114 may physically incorporate and/or be coupled to (e.g., via wired or wireless communication channel) a plurality of sensors 116. The present disclosure does not limit number of cameras included in the dashcam. Additionally, the dashcam as disclosed herein can further include hardware or software components, such as one or more electrical components, circuitries, processing unit, memory, data storage, display unit, and/or various sensors. The type of hardware and/or software components are not limited in the present disclosure.

b. User Device 130

In some embodiments, the user device 130 can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. In some embodiments, the user device 130 may execute an application (e.g., a browser, a stand-alone application, etc.) that allows a user to access interactive user interfaces, view images, analyses, or aggregated data, and/or the like as described herein. In various embodiments, users may interact with the dashcam via various devices. Such interactions may typically be accomplished via interactive graphical user interfaces or voice commands, however alternatively such interactions may be accomplished via command line, and/or other means.

c. Backend Server 120

In some embodiments, the backend server 120 is connected to the dashcam 112 via the network 160. In these embodiments, the backend server 120 can store data received from the dashcam 112 into a data storage 124. The data can include, for example, images or videos captured by the dashcam 112, a driver profile, etc. In one embodiment, the vehicle gateway 114 is connected with the backend server 120 via the network 160.

In some embodiments, the backend server 120 further includes an image processing component 122 and/or machine learning component 126. In some embodiments, the image processing component 122 can be utilized to process images stored in the data storage to use the images in another application. For example, the image processing component 122 may process the images to determine a driving behavior for each driver. In some embodiments, the processed results also can be used to train the machine learning component 126. In some embodiments, the machine learning component 126 may include one or more parameters, used for analyzing a region of interest of an object. For example, the dashcam 112 can access the machine learning component 126 and use the updated parameters in the machine learning component 126 to analyze a region of interest of a detected driver to determine whether the dashcam is installed in its acceptable position. In this example, the dashcam 112 can store the parameters received from the machine learning component 126 and utilize the parameters for determining and analyzing the region of interest of the detected driver.

In some embodiments, the backend server 120 can process a batch of data. For example, the backend server 120 may determine and group data into a batch of data, such as a specific number of samples of captured images or videos received from a plurality of vehicles 110 with dashcam(s) 112. The size of batch data or the quantity of data included is not limited in present disclosure and can be determined based on the specific application.

In some embodiments, a fleet administrator can access to the data storage 124 to analyze the driver's driving behavior. For example, the data storage 124 may include a plurality of data, where the data includes images or video files received from the dashcam corresponding to a specific driver. In some embodiments, the fleet administrator can determine driving behaviors corresponding to a specific driver by utilizing the plurality of data. In some embodiments, the image processing component 122 may process each data of the plurality of data and determine images or video data related to distracted driving behavior. The images or videos related to one or more distracted driving behavior can be correlated with the corresponding driver and stored as event data. In some embodiments, the data can be stored as a database.

d. Machine Learning Component 126

In some embodiments, a number of different types of algorithms may be used by the machine learning component 126 to generate the models. For example, certain embodiments herein may use a logistical regression model, decision trees, random forests, convolutional neural networks, deep networks, or others. However, other models are possible, such as a linear regression model, a discrete choice model, or a generalized linear model. The machine learning algorithms can be configured to adaptively develop and update the models over time based on new input received by the machine learning component 126. For example, the models can be regenerated on a periodic basis as new human physical characteristic or bio information is available to help keep the predictions in the model more accurate as the information evolves over time. The machine learning component 126 is described in more detail herein.

Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, large amounts (such as terabytes or petabytes) of player interaction data may be analyzed to generate models.

e. Networks 150, 160

In some embodiments, networks 150, 160 comprises any combination of wired and/or wireless networks, such as one or more direct communication channels, local area network, wide area network, personal area network, and/or the Internet, for example. In some embodiments, the communication between the vehicle 110 and the user device 130 may be performed via a short-range communication protocol, such as Bluetooth, Bluetooth low energy ("BLE"), and/or near field communications ("NFC").

In some embodiments, communication between the vehicle 110 and the backend server 120 can occur via network 160, such as via one or more secured networks, such as a local area network that communicates securely via the Internet with the backend server 120. The network 160 may include any wired network, wireless network, or combination thereof. For example, the network 160 may be a personal area network, local area network, wide area network, over-the-air broadcast network (e.g., for radio or television), cable network, satellite network, cellular telephone network, or combination thereof. As a further example, the network 160 may be a publicly accessible network of linked networks, possibly operated by various distinct parties, such as the Internet. In some embodiments, the network 160 may be a private or semi-private network, such as a corporate or university intranet. The network 160 may include one or more wireless networks, such as a Global System for Mobile Communications (GSM) network, a Code Division Multiple Access (CDMA) network, a Long Term Evolution (LTE) network, or any other type of wireless network. The network 160 can use protocols and components for communicating via the Internet or any of the other aforementioned types of networks. For example, the protocols used by the network 160 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein. In some embodiments, the networks 150, 160 may include some or all of the same communication protocols, services, hardware, etc. Thus, although the discussion herein may describe communication between the vehicle 110 and the user device 130 via the network 150 and communication between the vehicle 110 and the backend server via the network 160, communications of the devices are not limited in this manner. The various communication protocols discussed herein are merely examples, and the present application is not limited thereto.

III. Example of Dashcam

In some embodiments, the dashcam 112 may include different quantities of video and/or still image cameras. For example, as discussed in further detail below, in some embodiments, the dashcam 112 is configured to store multiple streams of video data from the inward-facing camera and/or outward-facing camera, such as a high-resolution and low-resolution video stream. In such an embodiment, the dashcam 112 may be configured to automatically remove older portions of the high-resolution video stream while maintaining and storing low-resolution video for an extended period. In some embodiments, the video files and/or related metadata may be stored in a combined media file in some embodiments. For example, the vehicle device may be configured to generate and store the newest (e.g., current) high-resolution, low-resolution, low-resolution, audio, and accelerometer data in a combined media file. In some embodiments, the combined media file may later be accessed by the user device to access the various files within the combined media file, such as to play back the high-resolution video with audio. In some embodiments, the combined data file may and/or modify contents of the combined media file, such as to remove high-resolution video for a particular time period from the combined media file.

In some embodiments, the dashcam 112 analyze the current installation position of the dashcam 112 in real time to determine whether the dashcam 112 is installed in an acceptable installation position. In some embodiments, the acceptable installation position can be defined as a position where the dashcam 112 is configured to capture images. For example, if the dashcam is configured to capture a driver's face, the dashcam may analyze its current installation position, such as whether the dashcam is installed in an acceptable position. In some embodiments, the dashcam 112 also may provide an instruction to the user (e.g., dashcam installer) to install the dashcam 112 in the acceptable installation position. This is provided merely as an example, and the dashcam 112 can be configured to capture other images based on specific applications. While the specifications of the dashcam 112 may vary greatly from one implementation to another, in one example embodiment, a dashcam may include some or all of the components below:

Outward-facing camera.

Inward-facing camera.

Audio input and/or output device(s) configured to provide voice coaching, such as voice-based feedback and alerts in response to detection of safety events, as well as the ability to turn on audio capture (e.g., via one or more microphones) for extra context during disputes and incidents.

Recording capabilities and storage to record video footage for a rolling time period. Depending on the allocation of disk space for high-resolution versus lower resolution video storage, the device may store different amounts of high-resolution and low-resolution video, such as in a combined media file. Depending on the video settings, such as frame rate and resolution of each of the high and low-resolution video streams, high-resolution video may require 10, 20, or more times more spaces than corresponding low-resolution video. As an example, a user may opt to store primarily high-resolution video, causing storage of about 60 hours of high-resolution and 50 hours of low-resolution video on a particular vehicle device, while if the user opts to store primarily low-resolution video, the system may store about 10 hours of high-resolution video and 300 hours of low-resolution video on that same vehicle device. These numbers vary based on many factors, such as maximum storage capacity, the particular encoding of the high-resolution and low-resolution video streams, etc. In some embodiments, the device may store 60-400 hours or more of driving time video (e.g., in some combination of low-resolution and high-resolution video streams) on the vehicle device, with an option for retrieval by the event analysis system, such as to provide additional context associated with a detected safety event in a safety dashboard. A combined media file including video data, audio data, and/or metadata, may be automatically uploaded to an event analysis system (e.g., in the cloud) for further analysis, such as automatically uploading five seconds before to five seconds after each safety event is detected. In some embodiments, if high-resolution video is available for the time period associated with the safety event, the high-resolution video is automatically uploaded.

Still images may also be captured and stored locally and/or transmitted to the event analysis system, such as in a combined media file and/or separate image files. A panic button may be provided to allow the driver to manually trigger a safety event and upload video footage from one or more of the cameras. For example, the panic button may be a physical button on the vehicle device enclosure and/or a virtual (or software) button that may be activated by a voice command from the driver (or a passenger in the vehicle).

Data transfer circuitry configured to automatically upload event data (e.g., metadata and asset data) to the event analysis system, where the event data may be further analyzed. In some implementations, the data transfer circuitry is configured to detect availability of cellular connectivity and, when connectivity is below a threshold, delay transmission of until cellular connectivity improves.

Mounting hardware for easily mounting on the inside of a windshield, such as with heavy duty acrylic foam tape, suction cup, velcro, or the like. Tilt control to allow for proper inward-facing orientation with a wide variety of windshields.

One or more accelerometers, such as accelerometers that measure acceleration (and/or related G forces) in each of multiple axes, such as in an X, Y, and Z axis.

One or more computer processors, such as high-capacity processors that enable concurrent neural networks for real-time artificial intelligence.

One or more gyroscope sensor configured to provide an orientation of the dashcam with an accurate precision.

One or more light sensor configured to automatically adjust display lights based on the ambient light.

One or more barometer configured to measure the atmospheric pressure.

One or more user (or driver) identification sensor, such as a fingerprint sensor and iris scanner.

GPS receiver and/or transmitter.

One or more display screens.

One or more digital compass configured to provide an orientation information of the dashcam.

One or more infrared sensor.

One or more pressure sensor.

One or more temperature sensor.

Air humidity sensor.

Near Field Communication (NFC) sensor.

Laser configured to provide a focus of the camera installed in the dashcam.

Human gesture recognition sensor configured to recognize one or more person's gesture.

One or more motion detection sensors.

Figure 2:
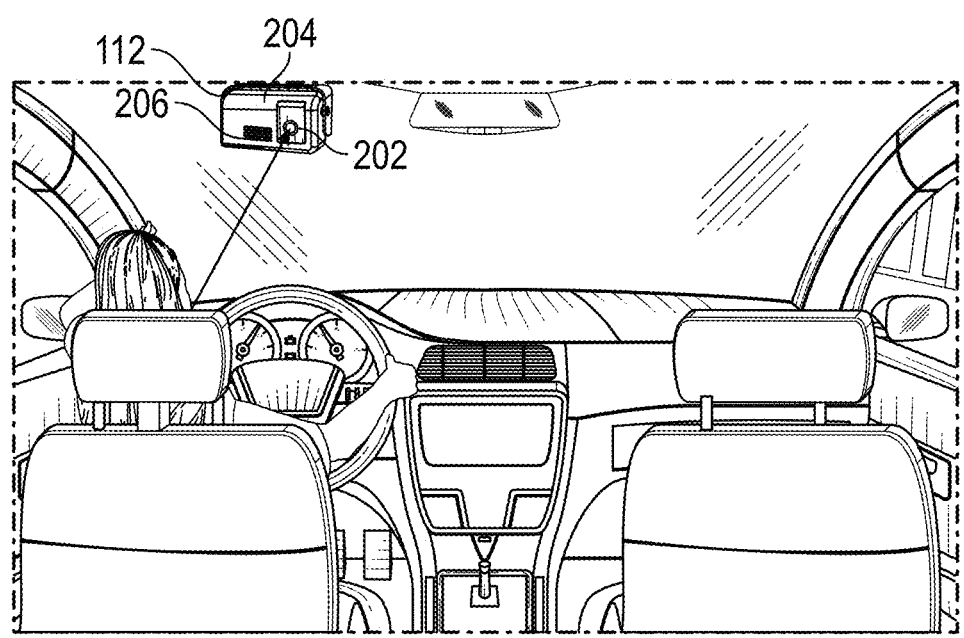
FIG. 2 illustrates an example dashcam mounted or secured inside a vehicle, according to one or more embodiments disclosed herein.

FIG. 2 illustrates an example dashcam 112 with an inward-facing camera 202 mounted inside a vehicle. In some embodiments, the dashcam 112 can also include an outward-facing camera. FIG. 2 merely shows an example of dashcam 112 position, and the dashcam 112 can be installed in other locations based on a specific application.

In some embodiments, as shown in FIG. 2, the dashcam 112 includes an inward-facing camera 202. In some embodiments, the inward-facing camera 202 can be configured to monitor one or more objects or person inside the vehicle. In some embodiments, the dashcam 112 can include an access panel 206 configured to allow alert signals from a speaker within the enclosure 204 of the dashcam 112 to be better heard within the vehicle. In some embodiments, the dashcam 112 can include a microphone. In some embodiments, the dashcam 112 can include an outward-facing camera, positioned to obtain images forward of the vehicle. The dashcam 112 does not limit number of cameras included within the dashcam 112 housing.

Additionally, the dashcam, as disclosed herein, can also include any number of different software components, such as one or more video codec, one or more audio codec, encryption software, an image calibration software, a data processing software, data format conversion software, dashcam video playback software, and/or an image analysis software. The types and number of hardware components and/or software components are not limited in the present disclosure so that any hardware components and/or software components that enhance capture or quality of any captured images may be utilized by the dashcam. Furthermore, the arrangement of hardware components as shown in FIG. 2 can be changed based on specific applications.

IV. Example Architecture of a Dashcam

Figure 3:
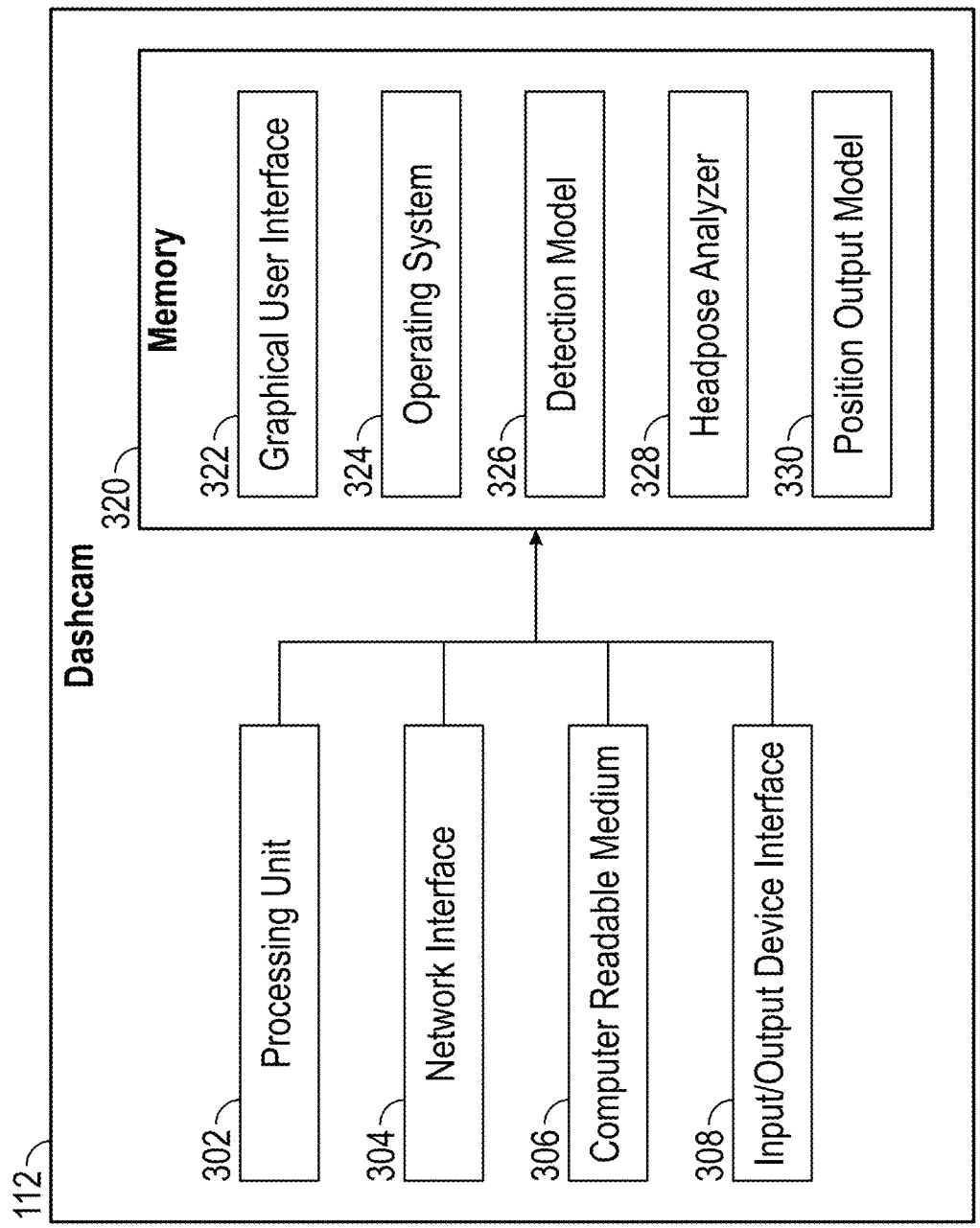
FIG. 3 depicts an example architecture of a dashcam, according to one or more embodiments disclosed herein.

FIG. 3 depicts one embodiment of an example hardware architecture of an illustrative dashcam 112. In some embodiments, the dashcam 112 can be configured to determine an acceptable dashcam installation position. In some embodiments, the dashcam generates dashcam installation results such as a dashcam installed position by detecting an object, analyzing one or more features of the object, and generating dashcam installed position results that include an inference of the dashcam installation position. In some embodiments, the general architecture of the dashcam 112 depicted in FIG. 3 includes an arrangement of computer hardware and software components that may be used to implement aspects of the present disclosure. As illustrated, In some embodiments, the dashcam 112 includes a processing unit 302, a network interface 304, a computer-readable medium 306, and an input/output device interface 308, all of which may communicate with one another by way of a communication bus. The components of the dashcam 112 may be physical hardware components.

In some embodiments, the network interface 304 may provide connectivity to one or more networks or computing systems, such as the networks 150 and 160 of FIG. 1. For example, the network 150 can connect the dashcam 112 and the user device 130. In this example the network 150 can be any combination of wired and/or wireless networks, such as one or more direct communication channels, local area network, wide area network, personal area network, and/or the Internet, for example. In addition, the network 160 can connect the dashcam 112 and the backend server 120. In some embodiments, the network 160 can be one or more secured networks, such as a local area network that communicates securely via the Internet. In some embodiments, the processing unit 302 may thus receive information and instructions by communicating with the user device and backend server via the networks 150, 160. In some embodiments, the processing unit 302 may also communicate to and from memory 320 and further provide output information for an acceptable dashcam installation position via the input/output device interface 308. For example, the dashcam 112 can generate a current dashcam installation position result, and the results can be generated as data at the output device interface and transmitted to the user device and/or backend server via the network interface 304. In some embodiments, the dashcam 112 may include more (or fewer) components than those shown in FIG. 3.

In some embodiments, the memory 320 may include computer program instructions that the processing unit 302 executes in order to implement one or more embodiments. In some embodiments, the memory 320 generally includes RAM, ROM, or other persistent or non-transitory memory. In some embodiments, the memory 320 may store an operating system 324 that provides computer program instructions for use by the processing unit 302 in the general administration and operation of the dashcam 112. In some embodiments, the memory 320 may further include computer program instructions and other information for implementing aspects of the present disclosure. For example, in one embodiment, the memory 320 includes a graphical user interface software 322 for communicating with other components and performing the dashcam installation verification.

Additionally, in some embodiments, the memory 320 can include a detection model 326. In some embodiments, the detection model 326 can detect one or more features corresponding to an object. In some embodiments, the object can be an object that the dashcam 112 is configured to monitor. For example, if a dashcam 112 (e.g., dashcam with an inward-facing camera) is configured to monitor a driver's behavior, the object can be the driver. In another example, if the dashcam (e.g., dashcam with an outward-facing camera) is configured to monitor another vehicle or the vehicle's driving path (e.g., road lanes) located in front of the vehicle, the other vehicles and/or the driving path can be a tracked or monitored object. In some embodiments, a feature can be a physical characteristic of the object. For example, if the object is the driver, a feature can be a human physical characteristic, such as human head, hand, or any characteristic related to a human physical characteristic.

In some embodiments, the detection model 326 can be configured to identify human physical characteristics. For example, the detection model 326 may detect the driver by determining the driver's head, body, and hands. In some embodiments, the detection model 326 determines a specific part of the human physical characteristics that need to be monitored or recorded by the dashcam. For example, the detection model 326, in determining that the human face is needed to be monitored by the dashcam 112, may detect the driver's head.

In some embodiments, the detection model 326 may provide an inference that the dashcam 112 is not installed in an acceptable position by determining that the detection model 326 cannot detect an object or features of the object (e.g., within a specific threshold or confidence level) that are configured to be monitored or recorded by the dashcam 112. For example, if the detection model 326 identifies a driver as an object and the driver's head as a feature of the object that is configured to be monitored or recorded by the dashcam 112, the detection model 326 may be trying to detect the driver and the driver's head. In this example, if the detection model 326 fails to detect the driver and/or the driver's head, the detection model 326 may generate an inference that the dashcam 112 is not installed within an acceptable position or range of positions and should be moved, or that the dashcam 112 is not installed facing an acceptable orientation and should be rotated.

In some embodiments, the detection model 326 may utilize a machine learning model to detect the object. In some embodiments, the machine learning model may determine object that the dashcam 112 is configured to monitor or record. For example, if dashcam 112 includes an inward-facing camera 202 configured to monitor or record the driver, the machine learning model may determine one or more human physical characteristics and detect the driver. In some embodiments, the machine learning model may determine features of the object that are needed to be monitored or recorded by the dashcam 112. For example, the machine learning model may determine that the human hand position is correlated with distracted driving behavior (e.g., if the driver is holding a phone against the driver's head), and the detection model 326 may detect the driver's hands is not in a desired position.

In some embodiments, the length of time a feature is not in a desired position or the degree to which a feature is not in a desired position (e.g., distance from a desired position, detection of an undesired position, or the like) can also be factored into the model. In some embodiments, the detection model 326 may determine a distracted driving behavior by analyzing captured images. For example, the detection model 326 can analyze the captured images and determine whether a driver and/or the driver's features, such as the driver's head and hands, are captured within desired positions or a range of positions. In some embodiments, the detection model 326 determines the driver's driving behavior or related features based on applying one or more criteria. For example with respect to a length of time, the criteria can be 2 seconds, so if the driver's hands are not placed on the steering wheel for more than 2 seconds, the detection model 326 can determine distracted driving behavior. In this example, the detection model 326 may analyze the captured images in real-time or near real-time, such that if the camera is capturing with 30 FPS and that the driver's hands are not detected on the steering wheel for more 60 frames, the detection model 326 may determine as distracted driving. In some embodiments, the criteria can be based on a driving pattern. For example, the criteria can be that if the driver's hands are not placed on the steering wheel for more than 2 seconds within 5 seconds of recorded images, the detection model 326 may determine distracted driving. In this example, the detection model 326 may analyze the captured images every 5 seconds, so if the camera is capturing the driver with 30 FPS, the detection model 326 analyzes every 150 frames, and if the driver's hands are not detected, more than 60 frames of the 150 frames, the detection model 326 may determine the distracted driving. For example, with respect to a distance from a desired position, the criteria can be that a person's hand be 6 inches from the steering wheel, so if the driver's hands are not placed on the steering wheel or within 6 inches of the steering wheel, the detection model 326 can determine distracted driving behavior. For example, with respect to an undesired position, the criteria can be that a person's hand be next to the person's face (e.g., maybe taking a call on the person's phone), so if the driver's hands are next to the person's face, the detection model 326 can determine distracted driving behavior. In some embodiments, the detection model 326 utilizes a machine learning model to determine the criteria. For example, the criteria can be applied differently based on each driver's physical characteristic, driving length, driving time, road condition, etc. In another example, the machine learning model can be trained by collecting data related to distracted driving detection and updating its machine learned algorithm based on analyzing the collected data. The time frame and criteria shown in these examples are merely provided as examples, and the time frame and criteria can be determined based on particular dashcam specifications and applications.

In some embodiments, if the dashcam 112 also includes an outward-facing camera, the detection model 326 may determine that road lanes in front of the vehicle are objects that are needed to be monitored by the dashcam 112. In some embodiments, the detection model 326 may determine whether the road lanes in front of the vehicle are aligned with the dashcam position. For example, the detection model 326 may detect the lanes by determining whether the lanes are aligned in the center of the images captured by the dashcam 112. In some embodiments, if the road lanes are not aligned in the center position of the captured dashcam image, the detection model 326 may generate an inference that the outward-facing camera position (e.g., dashcam position) is not an acceptable position.

In some embodiments, the memory 320 can include a head pose analyzer 328. In some embodiments, the dashcam 112 may capture images or a video stream of a head pose of a driver and analyze whether the dashcam can detect the head pose of the driver. In some embodiments, the head pose analyzer 328 analyzes an image of the driver's head from the captured images from the dashcam 112. In some embodiments, the head poses analyzer 328 may predict the driver's head movement while driving a vehicle. In some embodiments, the head pose analyzer 328 utilizes a machine learning model to predict the driver's head movement. For example, by analyzing an image of driver's head from the captured image from the dashcam 112, the machine learning model provides a prediction of the driver's head movement. In some embodiments, based on the prediction of the driver's head movement, the head pose analyzer 328 may generate an inference of the dashcam position, such as whether the dashcam 112 is installed in an acceptable position.

In some embodiments, the head pose analyzer 328 analyzes one or more features in the driver's head, such as driver's face, by utilizing an image processing technique, such as a region of interest-based method. For example, the head pose analyzer 328 may crop the driver's face from the captured images and determine whether the dashcam 112 can capture a images of the driver's face. In one example of detecting the driver's face, a machine learning model can be used to detect the driver's face, and the detected driver's face can be cropped from the captured images. In some embodiments, the cropped image can be analyzed based on the clarity of the image. For example, the head pose analyzer 328 analyzes the clarity of the cropped images by applying one or more clarity criteria. In some embodiments, the clarity criteria can include the number of pixels to be included in the cropped images and/or the brightness of cropped images. For example, if the head pose analyzer 328 analyzes eyes of the driver, the clarity criteria can be the number of pixels included in each eye and brightness. In some embodiments, if the clarity of the cropped image does not satisfy the criteria, the head pose analyzer 328 may generate inferences that the dashcam 112 cannot capture a clear image.

In some embodiments, the memory 320 can further include a position output model 330. In some embodiments, the dashcam 112 can provide the analyzed results of the dashcam 112 installation position. In some embodiments, based on the analyzed results generated from the head pose analyzer 328, the position output model 330 may provide an acceptable dashcam installation position. For example, the position output model 330 may provide whether the current dashcam installation position is the acceptable installation position and instruction to install the dashcam in the acceptable installation position.

In some embodiments, based on the inferences generated by the detection model 326 and/or the head pose analyzer 328, the position output model 330 generates an instruction to facilitate changing the dashcam 112 installation position. In some embodiments, the position output model 330 generates a vectorized model of the current dashcam installation position and a vectorized acceptable position by processing the inferences generated by the detection model 326 and/or the head pose analyzer 328. In some embodiments, the position output model 330 generates a camera rotation model of the current dashcam viewing angle by processing the inferences generated by the detection model 326 and/or the head pose analyzer 328. For example, the position output model 330 may provide an acceptable viewing angle of the dashcam 112 and generate an instruction to rotate and/or tilt the camera of the dashcam 112 to capture the image within the acceptable angle.

In some embodiments, the position output model 330, based on analyzing the vectorized information, may provide an instruction to move the dashcam 112 and/or the dashcam camera, such as the inward-facing camera and/or outward-facing camera. For example, the position output model 330 provides one or more directions to move the dashcam 112, such as up, down, left, or right. In some embodiments, the position output model 330 provides tilting direction of the dashcam 112. In some embodiments, the position output model 330 provides one or more settings related to improve the clarity of the captured images from the dashcam 112. For example, the position output model 330 provides brightness required to improve the captured images' clarity.

V. Example Architecture of a User Device

Figure 4:
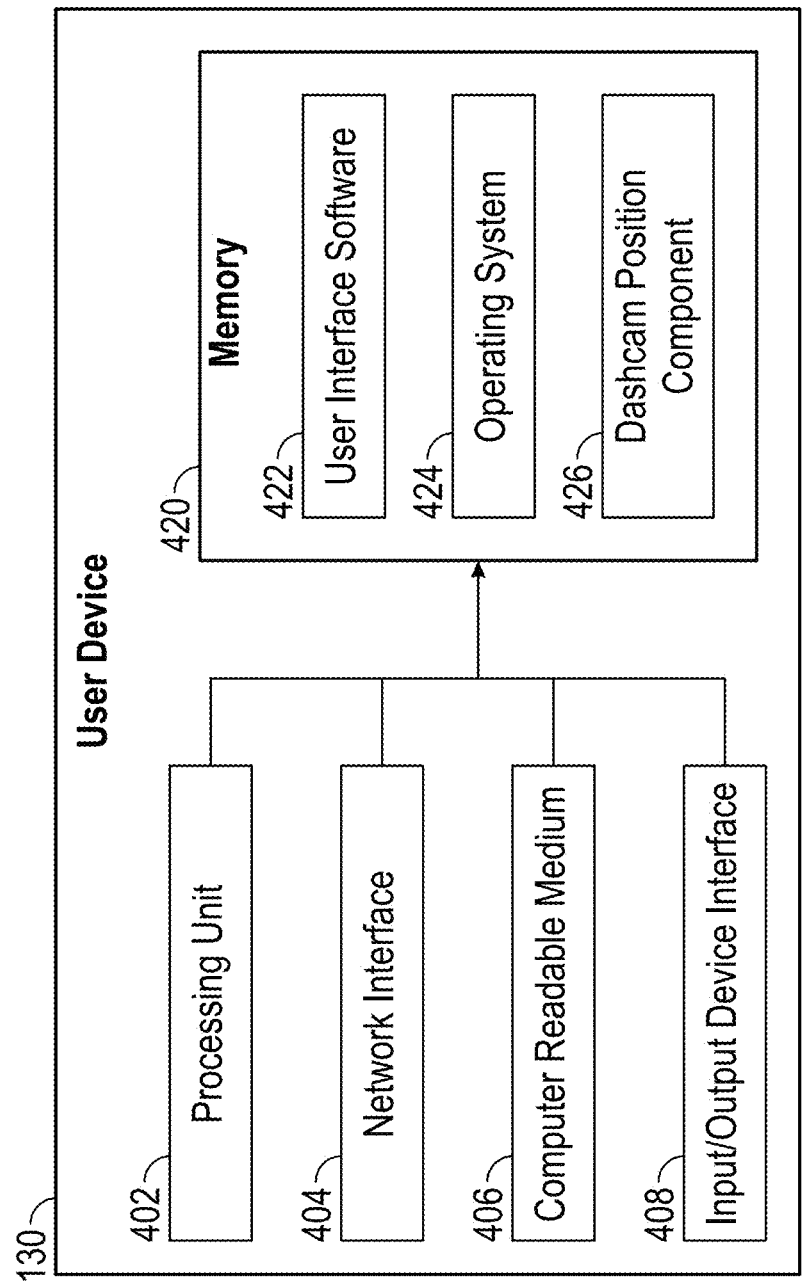
FIG. 4 depicts an example architecture of a user device, according to one or more embodiments disclosed herein.

FIG. 4 depicts one embodiment of an architecture of an illustrative user device 130. In some embodiments, the user device 130 can be configured to generate the dashcam calibration instruction, where the user (e.g., installer) can perform the calibration based on the instruction. In some embodiments, the user device 130 displays a current view of the dashcam 112 via the network 150. In some embodiments, the user device 130 may overlay a reference frame on the display, and the user can calibrate the dashcam installation position based on the current view and the reference frame. For example, the user device 130 may display a current view and a reference frame, where the driver should be shown inside the reference frame. In this example, the installer may adjust the dashcam installation position to locate the driver within the reference frame. In some embodiments, the general architecture of the user device 130 depicted in FIG. 4 includes an arrangement of computer hardware and software components that may be used to implement aspects of the present disclosure. As illustrated, in some embodiments, the user device 130 includes a processing unit 402, a network interface 404, a computer-readable medium 406, and an input/output device interface 408, all of which may communicate with one another by way of a communication bus. The components of the user device 130 may be physical hardware components.

In some embodiments, the network interface 404 may provide connectivity to one or more networks or computing systems, such as the networks 150 of FIG. 1. For example, the network 150 can connect the dashcam 112 and the user device 130. In this example the network 150 can be any combination of wired and/or wireless networks, such as one or more direct communication channels, local area network, wide area network, personal area network, and/or the Internet, for example. In addition, the network 160 can also connect the dashcam 112 and the user device 130. In some embodiments, the network 160 can be one or more secured networks, such as a local area network that communicates securely via the Internet. In some embodiments, the processing unit 402 may also communicate to and from memory 420 and further provide output information for an acceptable dashcam installation position via the input/output device interface 408. For example, the user device 130 may display streaming images (or video) received from the dashcam 112 via the network 150. Based on the streaming images, the user device 130 may provide an instruction for the dashcam installation position calibration. In some embodiments, the user device 130 may include more (or fewer) components than those shown in FIG. 4.

In some embodiments, the memory 420 may include computer program instructions that the processing unit 402 executes in order to implement one or more embodiments. In some embodiments, the memory 420 generally includes RAM, ROM, or other persistent or non-transitory memory. In some embodiments, the memory 420 may store an operating system 424 that provides computer program instructions for use by the processing unit 402 in the general administration and calibration of the dashcam 112 position. In some embodiments, the memory 420 may further include computer program instructions and other information for implementing aspects of the present disclosure. For example, in one embodiment, the memory 420 includes a graphical user interface software 422 for communicating with other components and performing the dashcam position calibration. For example, the user interface software 422 may provide live streaming images captured by the dashcam 112. In some embodiments, the user interface software 422 may further provide a reference frame overlayed on the live streaming images.

In some embodiments, the memory 420 can include a dashcam position component 426. In some embodiments, the user device 130 receives, from the dashcam 112, a real-time or near real-time images captured by the dashcam 112 via the network interface 404 and displays the received images on the display of the user device 130. In some embodiments, the dashcam position component 426 may display on the display a reference location of an object or features of the object that are configured to be monitored or recorded by the dashcam 112. For example, if the dashcam is configured to monitor a driver, the dashcam position component 426 may provide a reference location, where the driver should be located.

In some embodiments, the dashcam position component 426 may generate a reference frame and provide it to the user interface software 422 to display on the user device 130. For example, if the dashcam 112 is configured to monitor a driver while operating the vehicle, the driver's head and hands should be seen within the reference frame. In this example, the installer may determine whether the driver's head and hands are within the boundary of the reference frame in real-time or near real-time by using the user device 130, and adjust the dashcam or/and camera position to locate the driver's head and hands within the reference frame.

In some embodiments, the dashcam position component 426 displays the reference frame by dynamically adapting to its environment. For example, if a new driver having longer or shorter height than a previous driver is sitting on the driver seat of the vehicle, the reference frame position can be changed based on the height of the new driver.

In some embodiments, the dashcam position component 426 implements a machine learning model to generate the reference frame information. In some embodiments, the dashcam position component 426 receives the reference frame information from the dashcam 112. In alternative embodiments, the dashcam position component 426 receives the reference frame information from the backend server 120. For example, the backend server 120 may store a reference frame location corresponding to each driver, and the reference frame can be provided to the user device, when the corresponding driver accesses to the user device.

VI. Example User Device Interface Displaying a Reference Frame

Figure 5C:
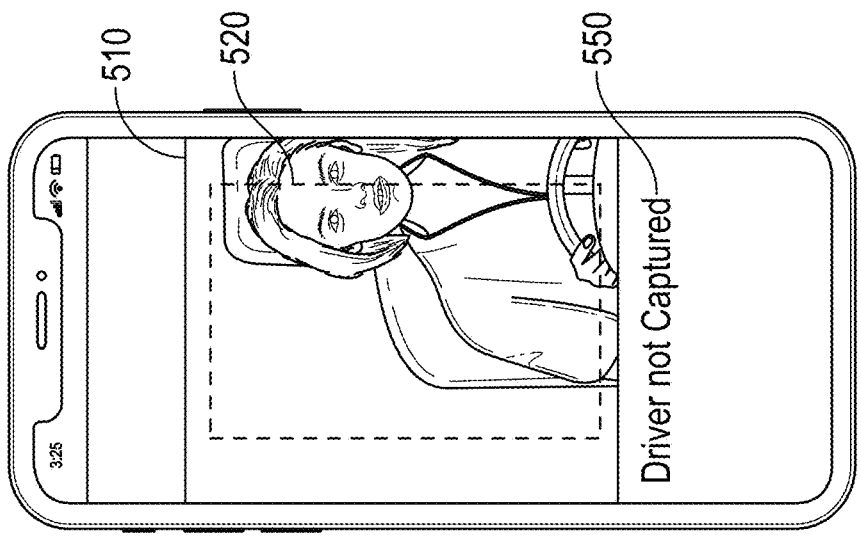
FIGS. 5A-5C illustrate examples of a user device displaying images captured from a dashcam mounted in a vehicle.
Figure 5B:
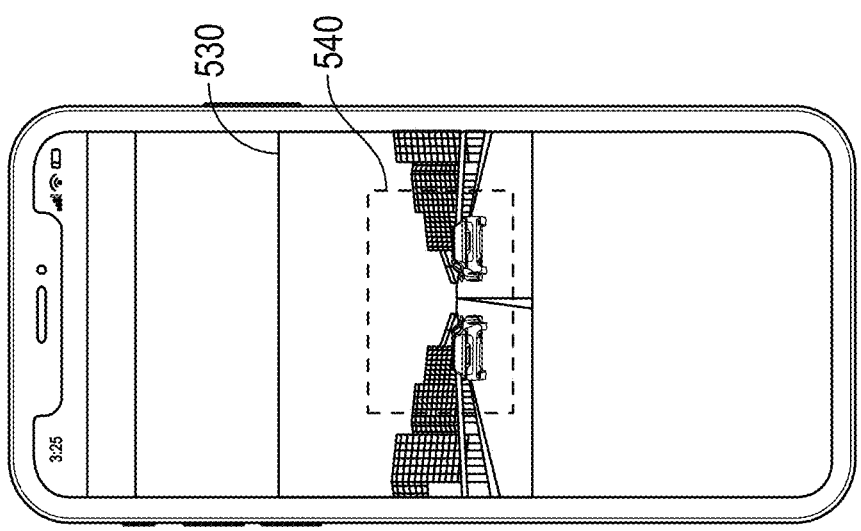
Figure 5A:
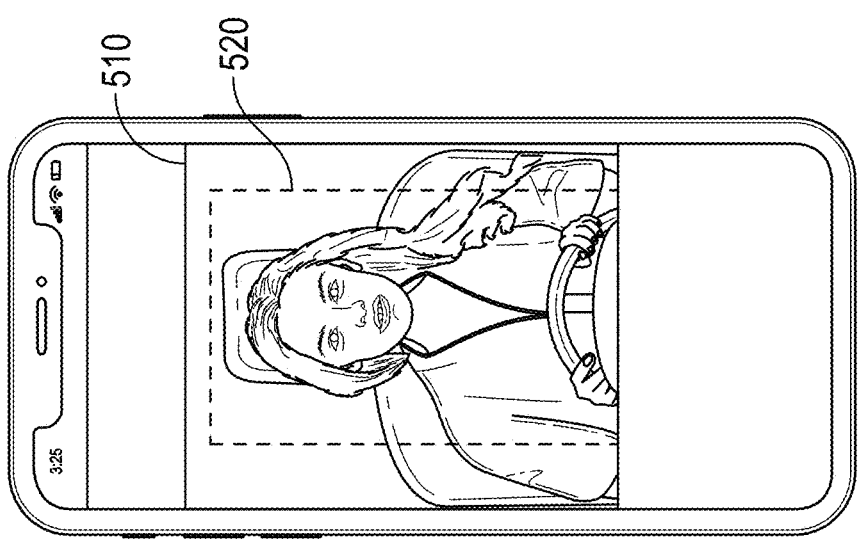

FIGS. 5A, 5B, and 5C illustrate examples of user device 130 displaying a reference frame. In some embodiments, as shown in FIG. 5A, the user device 130 may display images 510 captured by an inward-facing camera. In some embodiments, the dashcam position component 426 may provide a reference frame 520 that the driver's head and hands should be located within the reference frame 520. Thus, the installer can adjust the dashcam position accordingly. In some embodiments, as shown in FIG. 5B, the user device 130 may also display images 530 captured by an outward-facing camera. In some embodiments, as shown in FIG. 5B, the reference frame 540 is overlayed onto the image 530, and the dashcam position can be adjusted to locate the centerline of the roadway within the reference frame 540. In some embodiments, as shown in FIG. 5C, the user device 130 may display an inference, such as whether the dashcam 112 is installed in an acceptable position. For example, as shown in FIG. 5C, when the driver is not located within the reference frame 520, the user display may display an inference 550 such as "driver not captured." In some embodiments, the user device may display instruction for relocating the dashcam 112 into an acceptable position. For example, the user device 130 may display an instruction, such as "move dashcam position to the right, the left, up, or down," and/or "tilt camera angle up, down, left, or right." These reference frames, dashcam installation inferences, and instructions, as shown in FIGS. 5A, 5B, and 5C, are provided merely as examples. Furthermore, the reference frame and images that need to be located within the reference frame, the types of inferences, and the instructions can be determined based on the specific application.

VII. Example User Device Interface with Cropping a Region of Interest

Figure 6:
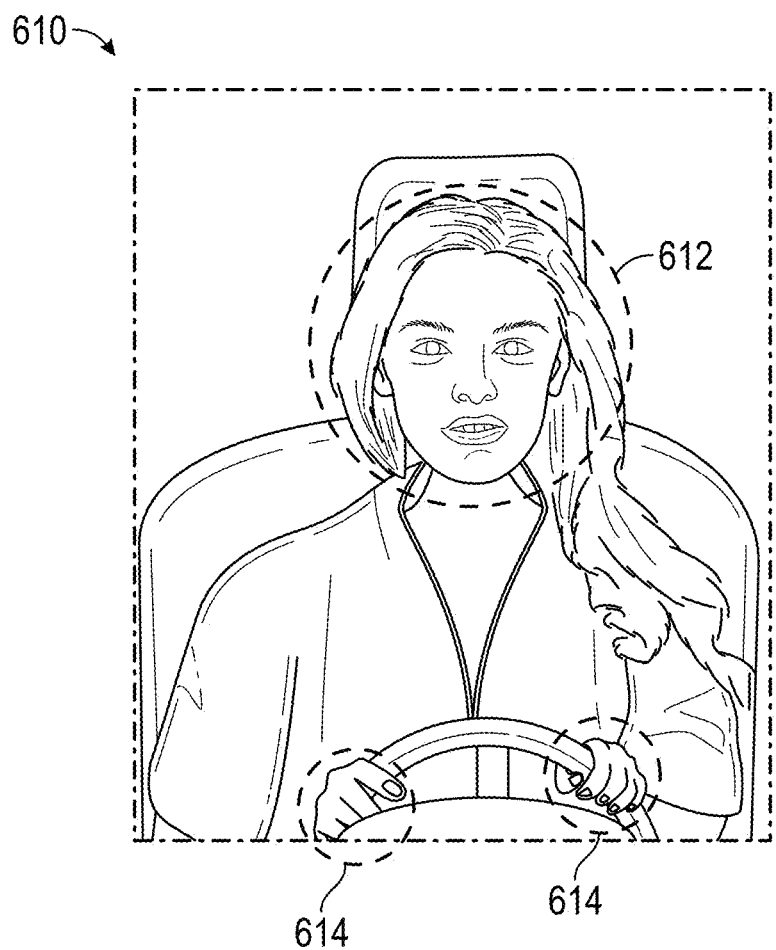
FIG. 6 illustrates an example of determined regions of interest from a captured image by the dashcam, according to one or more embodiments disclosed herein, such as from FIG. 5A, for example.

FIG. 6 illustrates an example of determined regions of interest from a captured image by the dashcam, according to one or more embodiments disclosed herein, such as from FIG. 5A, for example. In some embodiments, a machine learning component 126 can be used to assist the dashcam 112 in detecting and analyzing object or person. In some embodiments, as described in the above, the dashcam 112 can be configured to implement a machine learning model and used in the detection model 326 and head pose analyzer 328 of the dashcam 112. In some embodiments, the machine learning model can use one or more machine learning algorithms to generate one or more prediction models or parameter functions. For example, to detect a driver, the machine learning model may crop a face 612 and hands 614 of the driver from the captured image 610 by the dashcam 112. In some embodiments, the machine learning model may utilize its learned parameters to recognize the boundary of the face and hands within the captured image. In some embodiments, the machine learning model also can determine whether the cropped images of the face 612 and hands 614 are clearly captured using the dashcam 112. In some embodiments, the parameters or algorithms of the machine learning model can be updated using the machine learning component 126 in the backend server 120. In these embodiments, the dashcam 112 may receive the updated machine learning parameter from the backend server 120 via the network 150.

In some embodiments, the dashcam 112 can monitor the driver and detect distracted driving behavior based on analyzing the region of interest. In some embodiments, the dashcam 112 may define one or more regions of interest. For example, as shown in FIG. 6, the dashcam 112 defines regions of interest of driver's hands 614 and the driver's face 612. In some embodiments, the dashcam 112 determines distracted driving behavior by analyzing the defined regions of interest. For example, the dashcam 112 can analyze images of the defined regions of interest, such as the driver's face and hands 612 and 614, respectively. In some embodiments, the dashcam 112 determines the driver's distracted driving behavior based on applying one or more criteria. For example, the criteria can be 2 seconds, so if the driver's hands are not placed on the region of interest 614 for more than 2 seconds, the dashcam 112 can determine the distracted driving behavior. In this example, the dashcam 112 may analyze the driver's hands in real-time or near real-time, such that if the camera is capturing with 30 FPS and that the driver's hands are not detected within the region of interest 614 more than 60 frames, the dashcam 112 may determine as distracted driving. In some embodiments, the criteria can be based on a driving pattern. For example, the criteria can be that if the driver's hands are not placed within the defined region of interest for more than 2 seconds within 5 seconds of recorded images, the dashcam 112 may determine distracted driving. In this example, the dashcam 112 may analyze the captured images every 5 seconds, so if the camera is capturing the driver with 30 FPS, the dashcam 112 analyzes every 150 frames, and if the driver's hands are not detected on the region of interest 614, more than 60 frames of the 150 frames, the dashcam 112 may determine the distracted driving. In some embodiments, the dashcam 112 utilizes a machine learning model to determine the criteria. For example, the criteria can be applied differently based on each driver's physical characteristic, driving length, driving time, road condition, etc. In another example, the machine learning model can be trained by collecting data related to distracted driving detection and updating its machine learned algorithm based on analyzing the collected data. The time frame and criteria shown in these examples are merely provided as examples, and the time frame and criteria can be determined based on particular dashcam specifications and applications.

VIII. Process for Dashcam Installation System

Figure 7:
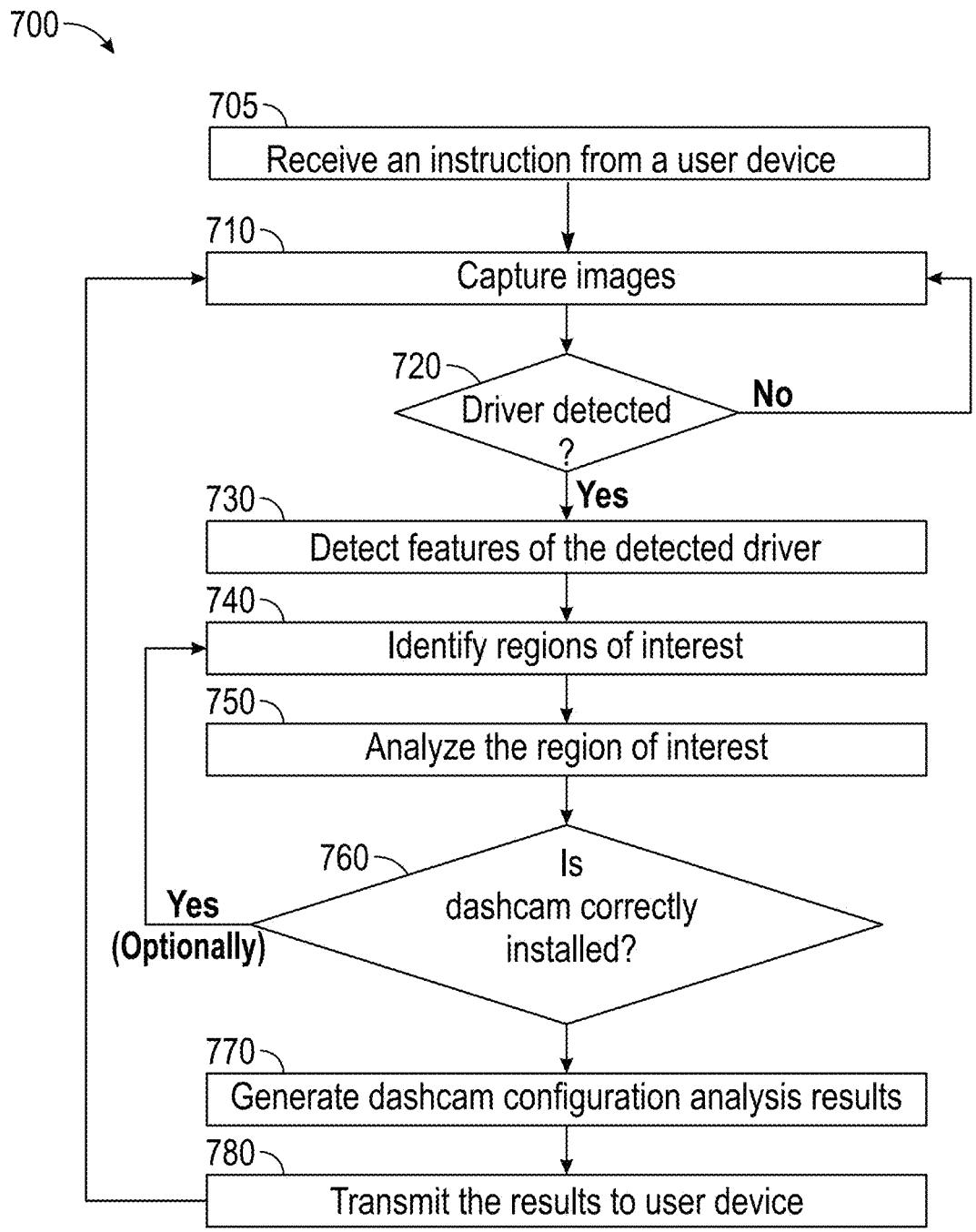
FIG. 7 shows a flow diagram of a method for providing a dashcam installation position analysis results for a dashcam installation system, according to one or more embodiments disclosed herein.

FIG. 7 shows a flow diagram of a method 700 for providing a dashcam 112 installation position analysis results for a dashcam installation system. As discussed above, in some embodiments, the dashcam 112 can be installed within the vehicle 110 and may include the inward-facing camera configured to capture images of one or more objects or persons inside the vehicle. In some embodiments, the dashcam 112 may further include an outward-facing camera and configured to capture images of the front view of the vehicle 110. In some embodiments, the dashcam 112 is connected with the user device 130 via the network 150. In some embodiments, the dashcam 112 is connected with the backend server 120 via the network 160. Also, in some embodiments, the dashcam 112 can be configured to include a machine learning model to perform one or more embodiments, as disclosed herein. In these embodiments, the machine learning model can be trained and/or updated by receiving and/or updating one or more machine learning model parameters from the machine learning component 126. In some embodiments, the dashcam 112 installation position analysis is based on whether the dashcam 112 is installed within an acceptable position. In some embodiments, an acceptable position of a dashcam can be defined as a range of physical placements/locations in a vehicle and/or in combination with an orientation/direction that a dashcam is facing or is otherwise positioned to face (e.g., by rotating the dashcam once secured to the vehicle), so that the dashcam can visually capture an image of one or more objects that the camera is configured to monitor and/or analyze. For example, the dashcam can be configured to monitor a driver behavior by detecting features or factors that indicate a likelihood that the driver is driving distracted (e.g., on the phone, not looking at the road, or the like). Such feature or factors may include one or more of: a driver's head pose or movements, hand position and movements, and/or other body movements. In one example, an acceptable dashcam position can be a position where the camera can capture the driver's head pose, hands, and body at an angle that can show a sufficient range of motion of the driver and/or camera move during operation of the vehicle.

For illustration purposes, the method 700 describes the process for generating dashcam 112 configuration result for the dashcam 112, having an inward-facing camera configured to detect a driver. In block 705, the dashcam 112 can receive an instruction from the user device 130 via a network 150. In some embodiments, the instruction can be a request to perform a current dashcam position analysis. For example, a dashcam installer by using the user device 130 can request to the dashcam 112 to perform the dashcam 112 position analysis. In this example, the dashcam 112 may provide the analysis results according to one or more embodiments as disclosed herein. In some embodiments, the user device 130 can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. In some embodiments, the user device 130 may execute an application (e.g., a browser, a stand-alone application, etc.) that allows a user to access interactive user interfaces, view images, analyses, or aggregated data, and/or the like as described herein. In various embodiments, users may interact with the dashcam via various devices. Such interactions may typically be accomplished via interactive graphical user interfaces or voice commands, however alternatively such interactions may be accomplished via command line, and/or other means. In some embodiments, the network 150 can comprise any combination of wired and/or wireless networks, such as one or more direct communication channels, local area network, wide area network, personal area network, and/or the Internet, for example. In some embodiments, the communication between the vehicle 110 and the user device 130 may be performed via a short-range communication protocol, such as Bluetooth, Bluetooth low energy ("BLE"), and/or near field communications ("NFC").

In block 710, the dashcam 112 can capture images. In some embodiments, the dashcam 112 may include an inward-facing camera. The inward-facing camera can be utilized to monitor a person inside a vehicle. For example, the inward-facing camera can be configured to monitor the driver to detect whether the driver is distracted from driving. In some embodiments, the dashcam 112 further include an outward-facing camera. The outward-facing camera can be configured to monitor the outward of the vehicle, such as the front view of the vehicle. For example, the outward-facing camera can determine whether the driver is driving carefully by identifying a distance to obstacles detected along the driving path of the vehicle.

In block 720, the dashcam 112 can detect the driver. In some embodiments, the dashcam 112 may detect the driver by accessing to the captured images. In some embodiments, the dashcam 112 may analyze a human physical characteristic in detecting the driver. For example, the dashcam 112 may analyze its captured image and detect the driver by determining one or more human physical characteristics such as head, neck, and/or hands. In some embodiments, the dashcam 112 may utilize a machine learning model to detect the driver. If the driver is detected, the process continues to block 730. If the driver is not detected, the dashcam 112 may continue to capture the images at block 710.

In some embodiments, the dashcam 112 may provide calibration information to the installer to detect the driver. In some embodiments, the user device 130 may display the captured images received from the dashcam 112 via the network 150. In some embodiments, the user device may display a reference frame 520 by overlaying the reference frame 520 on the captured image. For example, to detect the driver, the driver's head and hands should be located within the reference frame 520. Thus, the installer can calibrate the dashcam position accordingly. In some embodiments, the user device 130 may display an inference, such as whether the dashcam 112 can detect the driver. For example, when the driver is not located within the reference frame 520, the user display may display an inference, such as "driver not detected." In some embodiments, the user device may display dashcam 112 position calibration instructions for relocating the dashcam 112 into an acceptable position. For example, the user device 130 may display an instruction, such as "move dashcam position to the right, the left, up, or down," and/or "tilt camera angle up, down, left, or right."

In block 730, the dashcam 112 can detect features of the detected driver. The features can be determined based on the specific application. For example, if the dashcam 112 is configured to monitor the driver's distraction during the driving, the features can include eyes and/or hands of the driver.

In block 740, the dashcam 112 can identify regions of interest. In some embodiments, the regions of interest can be based on the detected features of the driver. For example, if the detected features include the driver's eyes, the region of interest can be the eyes. In some embodiments, the dashcam 112 may crop the regions of interest, such as the driver's eyes from the captured image. In some embodiments, the dashcam 112 can be configured to include a machine learning model that can provide spatial information in cropping the regions of interest. For example, the machine learning model may analyze the pixels in the captured images and determine pixels related to the human eyes. In some embodiments, the regions of interest can include one or more regions in the captured images by the dashcam 112.

In block 750, the dashcam 112 may analyze the regions of interest to determine whether the dashcam 112 can capture clear images of the features or regions of interest. In some embodiments, the clarity of the captured features or the regions of interest can be determined based on their threshold of visibility. For example, the threshold of visibility can include one or more parameters related to the visibility of the images, such as a number of pixels, resolution, noise, artifacts, blur factors, etc. In another example, the threshold of visibility can correspond to a percentage or ratio of a complete view of the region of interest that is visible in the captured image from the dashcam 112. In some embodiments, the dashcam 112 is configured to include a machine learning model to analyze the regions of interest. For example, a threshold portion that can be used to determine the threshold of visibility can be identified or calculated by using a machine learning model. In some embodiments, the determined threshold of visibility can be used to train the machine learning model.

In block 760, the dashcam 112 may determine whether the dashcam is correctly installed in an appropriate position based on the analyzed results of the identified regions of interest. For example, if the analyzed results indicate that the regions of interest are not clear (e.g., the visibility of the regions of interest is less than the threshold value), the dashcam 112 may determine that the dashcam is incorrectly installed. In some embodiments, if the dashcam is incorrectly installed, the process continues to the block 770. For example, the dashcam 112 may perform the blocks 740-760 repeatedly at preconfigured times (e.g., every 10 minutes, every 1 hour, every time the car is turned on, everything the car resume motion from a stop, or the like). In some embodiments, this monitoring aspect of the dashcam 112 can provide a real-time or near real-time monitoring aspect of the dashcam position. For example, if the dashcam position is changed to an incorrect position during the driving or due to an external force, the process continues to the block 770 to update the driver via the user device with instructions on how to adjust the dashcam. Additionally, if a user is checking the dashcam installation, the process may also proceed to block 770 as well such that the user device may receive a confirmation of a successful installation.

In block 770, the dashcam 112 may generate the dashcam configuration analysis results. In some embodiments, the results may include one or more inferences to correct or adjust the dashcam position and/or orientation. For example, the results may provide an indication of an acceptable dashcam position, instructions to move or rotate the dashcam 112, instructions to change one or more dashcam settings related to the visibility (e.g., focus, brightness, wiping the lens to clean off debris, or the like), instructions to adjust one or more cabin light or driving position settings, or the like.

In some embodiments, the dashcam 112 generates an instruction to facilitate changing the dashcam 112 installation position. In some embodiments, the dashcam 112 generates a vectorized model of the current dashcam installation position and a vectorized acceptable position by processing the inferences generated by the detection model 326 and/or the head pose analyzer 328. In some embodiments, the dashcam 112 generates a camera rotation model of the current dashcam viewing angle by processing the inferences. For example, the dashcam 112 may provide an acceptable viewing angle of the dashcam 112 and generate an instruction to rotate and/or tilt the camera of the dashcam 112 to capture the image within the acceptable angle.

In some embodiments, the dashcam 112, based on analyzing the vectorized information, may provide an instruction to move the dashcam 112 and/or the dashcam camera, such as the inward-facing camera and/or outward-facing camera. For example, the dashcam 112 provides one or more directions to move the dashcam 112, such as up, down, left, or right. In some embodiments, the dashcam 112 provides tilting direction of the dashcam 112. In some embodiments, the dashcam 112 provides one or more settings related to improve the clarity of the captured images from the dashcam 112. For example, the position output model 330 provides brightness required to improve the captured images' clarity.

In block 780, the dashcam 112 may transmit the results generated in block 770 to the user device so that a user of the user device can perform an action based on the results. Such results may comprise electronic display instructions. For example, the dashcam 112 can provide the results of the dashcam 112 installation position. In another example, the dashcam 112 may provide an acceptable dashcam installation position. In another example, the dashcam 112 may provide whether the current dashcam installation position is the acceptable installation position and instruction to install the dashcam in the acceptable installation position. In some embodiments, the electronic display instructions are generated and displayed on the display of the user device 130.

In some embodiments, after the dashcam 112 transmits the results to the user device 130, as described in the block 780, the dashcam 112 may return to block 705 by receiving another instruction from the user device 130 and perform the blocks 710-780 as described above. For example, if the installed dashcam position is changed and/or if a driver is being changed, the user of the user device 130 may provide an instruction to perform the dashcam installation position analysis. In this example, the captured images can be images captured from the dashcam 112 positioned in the changed position and/or images of the changed driver.

ADDITIONAL IMPLEMENTATION DETAILS AND EMBODIMENTS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

It should be emphasized that many variations and modifications may be made to the above-described embodiments, the elements of which are to be understood as being among other acceptable examples. All such modifications and variations are intended to be included herein within the scope of this disclosure.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method for configuring position of a dashcam, the computer-implemented method comprising, by one or more hardware processors executing program instructions:
in response to receiving first instructions from a user device, performing a first position analysis by:
accessing images captured by the dashcam comprising one or more cameras, wherein the dashcam is in a first position;
using a first machine learning model to analyze the images to identify a first region of interest corresponding to a first object;
based at least in part on the identification of the first region of interest, performing a first determination by determining that the dashcam is not in a placement or position that provides a threshold of visibility for the dashcam to capture the first region of interest; and
based at least in part on the first determination, generating and transmitting, to the user device, electronic display instructions configured to display information indicating how to place and position the dashcam to improve visibility of the first region of interest; and
in response to receiving, from the user device, second instructions indicating that the dashcam has been placed in a second position, performing a second position analysis by repeating the first position analysis but using new images captured by the dashcam from the second position.

2. The computer-implemented method of claim 1, wherein the first object is a person.

3. The computer-implemented method of claim 1, wherein the one or more cameras are comprised within a housing of the dashcam.

4. The computer-implemented method of claim 1, wherein the threshold of visibility corresponds to a percentage or ratio of a complete view of the first region of interest that is visible in the images.

5. The computer-implemented method of claim 1, wherein the threshold of visibility is calculated by the first machine learning model based at least in part on training data used to train the first machine learning model.

6. The computer-implemented method of claim 1, wherein the identification of the first region of interest is determined by the first machine learning model based on a spatial information associated with the first region of interest.

7. The computer-implemented method of claim 1, wherein the images comprise views of an interior of a vehicle.

8. The computer-implemented method of claim 1, wherein the threshold of visibility is assessed by determining that at least a threshold portion of the first region of interest is visible in the images.

9. The computer-implemented method of claim 1, wherein the dashcam is configured to transmit captured images to the user device, wherein the images are captured by the dashcam.

10. The computer-implemented method of claim 1, wherein the dashcam is configured to transmit a video stream of a series of images to the user device.

11. The computer-implemented method of claim 1, wherein the electronic display instructions include one or more directions to move the dashcam, wherein the one or more directions include up, down, left, or right.

12. The computer-implemented method of claim 1, wherein the user device is configured to receive the images captured by the dashcam, and wherein the user device is configured to provide information associated with dashcam position calibration.

13. The computer-implemented method of claim 12, wherein the information associated with dashcam position calibration is at least based on determining that a driver is located within a reference frame that is overlayed on at least one image of the images captured by a dashcam.

14. The computer-implemented method of claim 1, wherein the threshold of visibility represents a threshold number of pixels included in the first region of interest.

15. A system comprising:
a non-transitory computer readable storage medium having program instructions embodied therewith; and
one or more processors configured to execute the program instructions to cause the system to perform the computer-implemented method of claim 1.

16. The system of claim 15, wherein the threshold corresponds to a percentage or ratio of a complete view of the first region of interest that is visible in the images.

17. The system of claim 15, wherein the threshold is calculated by the first machine learning model based at least in part on training data used to train the first machine learning model.

18. The system of claim 15, wherein the identification of the first region of interest is determined by the first machine learning model based on a spatial information associated with the first region of interest.

19. A computer program product comprising a computer-readable storage medium having program instructions embodied therewith, the program instructions executable by one or more processors to cause the one or more processors to perform the computer-implemented method of claim 1.

20. The computer program product of claim 19, wherein the threshold corresponds to a percentage or ratio of a complete view of the first region of interest that is visible in the images.

21. The computer program product of claim 19, wherein the threshold is calculated by the first machine learning model based at least in part on training data used to train the first machine learning model.

\* \* \* \* \*